(12) United States Patent
Xin et al.

(10) Patent No.: US 11,778,544 B2
(45) Date of Patent: Oct. 3, 2023

(54) SLICE INFORMATION PROCESSING METHOD AND APPARATUS

(71) Applicant: HUAWEI TECHNOLOGIES CO., LTD., Guangdong (CN)

(72) Inventors: Yang Xin, Shanghai (CN); Xiaobo Wu, Shanghai (CN); Weiwei Chong, Shanghai (CN); Fangyuan Zhu, Beijing (CN); Clarissa Marquezan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 17/201,916

(22) Filed: Mar. 15, 2021

(65) Prior Publication Data

US 2021/0204198 A1 Jul. 1, 2021

Related U.S. Application Data

(63) Continuation of application No. PCT/CN2019/105204, filed on Sep. 10, 2019.

(30) Foreign Application Priority Data

Sep. 28, 2018 (CN) .......................... 201811142739.0

(51) Int. Cl.
*H04W 28/02* (2009.01)
*H04L 41/342* (2022.01)
*H04W 48/14* (2009.01)

(52) U.S. Cl.
CPC ....... *H04W 48/14* (2013.01); *H04W 28/0268* (2013.01); *H04W 28/0289* (2013.01)

(58) Field of Classification Search
None
See application file for complete search history.

(56) References Cited

U.S. PATENT DOCUMENTS

2017/0359768 A1  12/2017  Byun et al.
2018/0123961 A1* 5/2018  Farmanbar .......... H04L 47/2408
(Continued)

FOREIGN PATENT DOCUMENTS

CA       3113115 A1 * 3/2020 ........... H04L 41/147
CN     106982458 A     7/2017
(Continued)

OTHER PUBLICATIONS

3GPP TS 23.503 V15.0.0 (Dec. 2017), "3rd Generation Partnership Project; Technical Specification Group Services and System Aspects; Policy and Charging Control Framework for the 5G System; Stage 2 (Release 15)," Dec. 2017, 56 pages.
(Continued)

*Primary Examiner* — Ajit Patel
(74) *Attorney, Agent, or Firm* — Fish & Richardson P.C.

(57) ABSTRACT

The present disclosure relates to slice information processing methods. One example method includes sending, by a management and control function network element, a first request to a data analytics function network element, where the first request requests first information of a slice network including at least one slice, and the first request includes identity information of the at least one slice, and receiving, by the management and control function network element, a first response from the data analytics function network element, where the first response includes the first information, and the first information is used for at least one of user control or application control of each slice of the at least one slice.

5 Claims, 12 Drawing Sheets

(56) References Cited

U.S. PATENT DOCUMENTS

| | | | |
|---|---|---|---|
| 2018/0132117 A1 | 5/2018 | Senarath et al. | |
| 2018/0270743 A1 | 9/2018 | Callard et al. | |
| 2019/0075552 A1* | 3/2019 | Yu | H04W 24/10 |
| 2019/0281494 A1* | 9/2019 | Chan | H04W 72/56 |
| 2020/0100137 A1* | 3/2020 | Panchal | H04W 48/18 |

FOREIGN PATENT DOCUMENTS

| | | | | |
|---|---|---|---|---|
| CN | 107919969 A | | 4/2018 | |
| CN | 108282350 A | | 7/2018 | |
| CN | 108293004 A | | 7/2018 | |
| CN | 110120879 A | * | 8/2019 | H04L 41/5003 |
| CN | 110912723 A | * | 3/2020 | H04L 41/0893 |
| EP | 3343978 A1 | | 7/2018 | |
| WO | 2018006381 A1 | | 1/2018 | |

OTHER PUBLICATIONS

China Mobile et al., "Use case NWDA-Assisted slice SLA guarantee and related Key Issue update," SA WG2 Meeting #128bis, S2-189048, Sophia Antipolis, France, Aug. 20-24, 2018, 2 pages.

Office Action in Chinese Application No. 201811142739.0, dated Dec. 2, 2020, 13 pages.

PCT International Search Report and Written Opinion in International Application No. PCT/CN2019/105204, dated Dec. 2, 2019, 16 pages.

3GPP TS 23.502 V1.2.0 (Sep. 2017), "3rd Generation Partnership Project; Technical Specification Group Services and System Aspects; Procedures for the 5G System; Stage 2 (Release 15)," Sep. 2017, 165 pages.

Extended European Search Report issued in European Application No. 19864994.9 dated Sep. 24, 2021, 14 pages.

Huawei et al., "Solution for QoS Provisioning and Adjustment," SA WG2 Meeting #127, S2-183635, Sanya, China, Apr. 16-20, 2018, 5 pages.

Mannweiler (Nok-De), "5G Mobile Network Architecture for diverse services, use cases, and applications in 5G and beyond; Deliverable D2.2; Initial overall architecture and concepts for enabling innovations," 5G PPP, 5G-Monarch, Project No. 761445, Jul. 2018, 111 pages.

Huawei et al., "Solution for Key Issue 5: NWDAF-Assisted QoS Profile Provisioning," SA WG2 Meeting #127, S2-185706, Sanya, China, Apr. 16-20, 2018, 5 pages.

Huawei, HiSilicon, "Update Solution 3 for Key Issue 5: NWDAF-Assisted QoS Profile Provisioning," SA WG2 Meeting #128Bis, S2-188268, Sophia, Antipolis, Aug. 20-24, 2018, 3 pages.

Office Action issued in Chinese Application No. 201811142739.0 dated May 26, 2021, 30 pages (with English translation).

Office Action issued in Indian Application No. 202137011931 dated Feb. 2, 2022, 6 pages.

\* cited by examiner

SLICE INFORMATION PROCESSING METHOD AND APPARATUS

CROSS-REFERENCE TO RELATED APPLICATIONS

This application is a continuation of International Application No. PCT/CN2019/105204, filed on Sep. 10, 2019, which claims priority to Chinese Patent Application No. 201811142739.0, filed on Sep. 28, 2018. The disclosure of the aforementioned applications are hereby incorporated by reference in their entireties.

TECHNICAL FIELD

Embodiments of this application relate to the field of communications technologies, and in particular, to a slice information processing method and an apparatus.

BACKGROUND

To satisfy requirements of different communications applications on network performance, the concept of network slice (NS) is introduced into a 5G network. That is, in the 5G network, resources and functions of an actual network are divided into different network slices to satisfy these different requirements. In this way, network OPEX and CAPEX can be reduced, and network operation modes can be enriched.

Currently, for network slices of different tenants, a network management device determines service level agreement (SLA) templates of the network slices of the different tenants based on a service level requirement of each tenant, and deploys the corresponding network slices based on the SLA templates. However, granularities of the SLA templates determined by the network management device based only on the service level requirements of the tenants are quite coarse. Consequently, it is difficult to ensure performance of the network slices. In addition, when allocating network resources to the network slices of the different tenants, the network management device can determine only a rough resource deployment status based on the SLA templates. Therefore, resources may be wasted or deployed resources may be insufficient, and the performance of the network slices may deteriorate. An ultimate goal of slice SLA assurance is to satisfy a service satisfaction requirement of a tenant for a service in a slice.

Currently, in the prior art, a slice SLA is ensured through management plane adjustment. A specific process is as follows: A network data analytics function (NWDAF) network element obtains service satisfaction of each service in a slice. Then, the NWDAF may train a mapping relationship between the service satisfaction of the service and a network slice KPI. After obtaining at least one slice requirement list sent by a PCF network element, the NWDAF sends a network slice KPIs list to the PCF network element for each slice requirement list. The slice requirement list is shown in Table 1, and the network slice KPIs list is shown in Table 2:

TABLE 1

Content of the slice requirement list

| IE/Group Name | Presence | Range | Semantics description |
| --- | --- | --- | --- |
| Slice Requirement list | 1 | | Slice requirement list |
| >Slice Requirement IEs | | 1 to M | One slice requirement information element |

TABLE 1-continued

Content of the slice requirement list

| IE/Group Name | Presence | Range | Semantics description |
| --- | --- | --- | --- |
| >>S-NSSAI | M | | Slice identity |
| >>Application Requirement list | M | 1 to N | Service requirement list in a slice |
| >>>Application ID | M | | Service identity |
| >>>Application Requirement | M | | Satisfaction requirement of a service, for example, 95%. That is, a service satisfaction percentage of the service (for example, a MOS of a voice service is greater than or equal to 3.0) is greater than or equal to 95% |

TABLE 2

Network slice KPIs list

| IE/Group Name | Presence | Range | IE type and reference |
| --- | --- | --- | --- |
| Network Slice KPIs List | | 1 | Network slice KPIs list |
| >Network Slice KPIs | | 1 to M | Network KPI information element |
| >>UL or DL F1-U Packet Loss Rate for gNB-CU | M | | Uplink/downlink packet loss rate on an F1-U interface of a gNB-CU |
| >>DL Packet Drop Rate for gNB-CU | M | | Downlink packet drop rate in the gNB-CU |
| ... | | | |
| >>Network Slice KPI X | M | | $X^{th}$ network slice KPI |

When network resources are insufficient to satisfy all slice requirements, the PCF network element determines a slice requirement list according to a local operator policy and the like, and sends a network slice KPIs list corresponding to the selected slice requirement list to an operation, administration, and maintenance (OAM) network element, and the OAM adjusts a network slice resource based on the network slice KPIs list. However, an air interface is still a key factor that affects service experience in a network slice. Therefore, the management plane-based solution may be useless.

SUMMARY

Embodiments of the present invention provide a slice information processing method and an apparatus, to ensure that service experience of a terminal in each slice is satisfied within different MOS ranges.

To achieve the foregoing objective, the embodiments of this application provide the following technical solutions:

According to a first aspect, this application provides a slice information processing method, including: sending, by a management and control function network element, a first request to a data analytics function network element, where the first request is used to request first information of a slice network including at least one slice, and the first request includes identity information of the at least one slice; and receiving, by the management and control function network element, a first response sent by the data analytics function network element, where the first response includes the first information, and the first information is used for at least one of user control or service control of each of the at least one slice.

This embodiment of this application provides the slice information processing method. The management and control function network element sends the first request to the data analytics function network element, to obtain the first information from the data analytics function network element. In this way, the management and control function network element can implement at least one of the user control or the service control of the slice based on the obtained first information. For example, either of the user control or the service control of the slice is implemented based on the first information; or the user control and the service control of the slice are implemented based on the first information. It is faster and more accurate to ensure, by adjusting, in the slice based on a control plane, a quantity of registered users and a percentage of users who's MOSs for a service are satisfied, that the slice satisfies an SLA than to ensure, by performing network resource adjustment based on a management plane, that the slice satisfies the SLA.

In a possible implementation, the first request further includes one or more of the following information of each slice: time information, geographical area information, and service requirement information of at least one service, where the service requirement information is used to indicate a requirement of the service. A service request message is sent, so that the data analytics function network element can obtain, based on the service request message, a parameter that satisfies a service requirement.

In a possible implementation, the service requirement information includes a service identity and one or more of the following information: a first data value of service experience, a first data value of a total quantity of services, a first data value of a percentage of a quantity of services satisfying the first data value of service experience, and network quality requirement information, where the network quality requirement information is used to indicate a network quality parameter required by the service. The service requirement information is used to indicate a service satisfaction requirement. For example, the first data value of a percentage of a quantity of services satisfying the first data value of service experience is 95%, that is, a service satisfaction (for example, a MOS of a voice service is greater than or equal to the first data value of service experience (for example, 3.0)) percentage of the service needs to be greater than or equal to 95%.

In a possible implementation, the network quality requirement information includes one or more of a first data value of a bandwidth, a first data value of a delay, a first data value of a packet loss rate, and a first data value of jitter, to indicate parameters such as the first data value of a bandwidth, the first data value of a delay, and the first data value of jitter that are required by the service to satisfy the foregoing requirement of the service.

In a possible implementation, the first response further includes the identity information corresponding to each of the at least one slice, and one or more of the following information corresponding to the slice: slice level information, network area information, or time information, where the slice level information is used to indicate a load level or a congestion level of the slice. For example, the slice level information may be 1, 2, 3, 4, or 5, where 1 indicates that the slice is idle, 2 indicates that the slice is lightly loaded, 3 indicates that the slice is fully loaded, 4 indicates that the slice is slightly congested, and 5 indicates that the slice is heavily congested. If learning, by using the slice level information, that the slice is congested, the management and control function network element may not allow a terminal to access the slice.

In a possible implementation, the first response further includes: network level information of the slice network, where the network level information is used to indicate a load level or a congestion level of the slice network. When a network level indicated by the network level information is lower than a first threshold, it indicates that load of the slice network is less than a second threshold or indicates that the slice network is not congested, and it indicates that the slice network may indicate an OAM network element to add a slice or indicate a policy control network element to transmit background traffic in the slice network.

The background traffic (BG) may also be referred to as background data (BD), and is usually defined as non-real-time interactive traffic, for example, traffic transmitted for a software update package, a software notification message, in-vehicle map information, and the like. Transmission of the background traffic has no requirement on network quality, and the background traffic can be transmitted provided that the slice network is not congested.

In a possible implementation, the first information includes at least one of at least one piece of user control information or at least one piece of service control information corresponding to each slice.

In a possible implementation, the user control information includes at least one of network area information and at least one piece of network slice instance information, and the network slice instance information includes identity information of a network slice instance and a maximum quantity of users; and the service control information includes at least one of network area information and at least one piece of network slice instance information, and the network slice instance information includes identity information of a network slice instance and at least one piece of service configuration information, where the service configuration information includes a service identity, a maximum quantity of users having the service identity, and at least one piece of service experience range information of the service; and the service experience range information includes a size of a service experience range, a maximum quantity of services within the service experience range, and at least one set of quality of service QoS parameters of the service experience range.

In a possible implementation, the method provided in this embodiment of this application further includes: receiving, by the management and control function network element from the data analytics function network element, the identity information of each of the at least one slice and one or more of the following information corresponding to the slice: geographical area information and service response information of the at least one service, where the service response information is used to indicate service information that is of the slice and that can be satisfied by the network. It is convenient for the management and control function network element to determine, based on the service response information of the at least one service, whether the network can satisfy a QoE requirement of the slice. When the management and control function network element determines that a QoE requirement of one slice cannot be satisfied, the management and control function network element triggers network resource adjustment.

In a possible implementation, the application response information includes a service identity and one or more of the following information corresponding to an: a second data value of a total quantity of services, a second data value of a percentage of a quantity of services satisfying the first data value of service experience, and a network quality parameter. In this way, the management and control function network element can determine a specific parameter that is of the service in the slice and that can be satisfied by the network.

In a possible implementation, the network quality parameter includes one or more of a second data value of a bandwidth, a second data value of a delay, a second data value of a packet loss rate, and a second data value of jitter. In this way, the management and control function network element can determine a specific network quality parameter that is of the service in the slice and that can be satisfied.

In a possible implementation, when the management and control function network element is a slice management and control network element, the method further includes: sending, by the slice management and control network element to at least one policy management and control network element corresponding to any one of the at least one slice, the identity information of the any one slice, and one or more of the following information corresponding to the any one slice: network area information, time information, or the at least one piece of service control information. For example, the slice level information may be 1, 2, 3, 4, or 5, where 1 indicates that the slice is idle, 2 indicates that the slice is lightly loaded, 3 indicates that the slice is fully loaded, 4 indicates that the slice is slightly congested, and 5 indicates that the slice is heavily congested. If learning, by using the slice level information, that the slice is congested, the policy management and control network element may reject a request for establishing a QoS flow corresponding to a service in the slice; or degrade a QoS parameter of an established QoS flow of a service in the slice, to ensure a minimum service experience requirement of the QoS flow, so that a resource is spared to ensure that a request for establishing the QoS flow corresponding to the service in the slice is received.

In a possible implementation, the method provided in this embodiment of this application further includes: obtaining, by the slice management and control network element, a second request of a terminal from an access and mobility management function network element, where the second request is used to request network slice instance information of a first slice serving the terminal, and the second request includes identity information of the first slice and network area information of the terminal; and sending, by the slice management and control network element, a second response to the terminal through the access and mobility management function network element, where the second response includes the network slice instance information of the first slice; and the network slice instance information of the first slice includes at least one of identity information corresponding to a network slice instance of the first slice or address information of a session management function network element corresponding to a network slice of the first slice.

In a possible implementation, when the management and control function network element is a policy management and control network element, the method provided in this embodiment of this application further includes: receiving, by the management and control function network element, a third request from an application network element, where the management and control function network element serves a second slice in the at least one slice, and the third request includes one or more of the following information corresponding to the second slice: identity information, time information, geographical area information, and service requirement information of at least one service; and sending, by the management and control function network element, a third response to the application network element, where the third response includes one or more of the following information corresponding to the second slice: the identity information, the geographical area information, and service response information of the at least one service; and the service response information is used to indicate service information that is of the slice and that can be satisfied by the network.

In a possible implementation, the method provided in this embodiment of this application further includes: receiving, by the management and control function network element, a fourth request from the application network element, where the fourth request is used to request to establish a service of the terminal in the second slice, and the fourth request includes one or more of the following information: the identity information of the second slice, a service identity of the service, time information, identity information of the terminal, and geographical area information of the terminal. In this way, the management and control function network element (for example, an NSSF network element) determines, based on the geographical area information of the terminal, a network slice instance to be accessed by the terminal.

In a possible implementation, the geographical area information includes one or more of the following information: identity information, at least one cell identity, at least one tracking area identity, at least one routing area identity, and at least one piece of global positioning system GPS information.

In a possible implementation, the network area information includes one or more of the following information about a network area: identity information, at least one cell identity (Cell ID), at least one tracking area (TA) identity, at least one routing area (RA) identity, at least one piece of global positioning system (GPS) information. For network area information in the following embodiments, refer to the description herein. Details are not described below again.

In a possible implementation, the time information includes one or more of the following information: a time stamp, a time window, a time interval, and a time period.

According to a second aspect, an embodiment of this application provides a slice information processing method, including: receiving, by a data analytics function network element, a first request from a management and control function network element, where the first request is used to request first information of a slice network, the slice network includes at least one slice, and the first request includes identity information of the at least one slice; and sending, by the data analytics function network element, a first response to the management and control function network element, where the first response includes the first information, and the first information is used for at least one of user control or service control of each of the at least one slice.

In a possible implementation, the first information includes one or more of the following information about each slice: at least one piece of user control information or at least one piece of service control information.

In a possible implementation, the user control information includes network area information and at least one piece of first network slice instance information, and the first network slice instance information includes identity information of a network slice instance and a maximum quantity of users; and the service control information includes network area information and at least one piece of second network slice instance information, and the second network slice instance information is used to determine service configuration information of at least one service in a second network slice instance.

In a possible implementation, the service configuration information includes a service identity, a maximum quantity of users, and at least one piece of service experience range information, where the service experience range information includes a size of a service experience range, a maximum quantity of services within the service experience range, and at least one set of quality of service QoS parameters of the service experience range.

In a possible implementation, the first request further includes one or more of the following information corresponding to each slice: time information, geographical area information, and service requirement information of at least one service, where the service requirement information is used to indicate a requirement of the service.

In a possible implementation, the application requirement information includes a service identity, a first data value of service experience, a first data value of a total quantity of services, a first data value of a percentage of a quantity of services satisfying the first data value of service experience, and network quality requirement information, where the network quality requirement information is used to indicate a network quality parameter required by the service.

In a possible implementation, the network quality requirement information includes one or more of the following information: a first data value of a bandwidth, a first data value of a delay, a first data value of a packet loss rate, and a first data value of jitter.

In a possible implementation, the first response further includes the identity information of each slice, and one or more of the following information corresponding to each slice: network area information and time information. The information in the first response is used to notify the management and control function network element of a satisfaction status of a requested value in the first request. For example, in the first request, a quantity of services in the slice needs to reach 10000, but the data analytics network element obtains that in the slice network, the slice can accommodate only 9000 services. The information in the first response is fed back by the management and control function network element to an application network element.

In a possible implementation, the method provided in this embodiment of this application further includes: sending, by the data analytics function network element to the management and control function network element, the identity information of the slice and one or more of the following information corresponding to the slice: geographical area information and service response information of the at least one service, where the service response information is used to indicate service information that is of the slice and that can be satisfied by the network.

In a possible implementation, the method provided in this embodiment of this application further includes: obtaining, by the data analytics function network element, first data that corresponds to any slice and that is on at least two network elements, where the first data that corresponds to the any slice and that is on the at least two network elements includes a first identity; and obtaining, by the data analytics function network element based on the first identity and the first data that corresponds to the any slice and that is on the at least two network elements, second data corresponding to the any slice, where the second data includes at least the first data that corresponds to the any slice and that is on each network element.

Specifically, the data analytics function network element obtains service data that is of at least one QoS flow corresponding to each slice and that is on the application network element and network data that is of the at least one QoS flow corresponding to the slice and that is on a network element. The service data includes the first identity and geographical area information, and the network data includes the first identity and network area information. The data analytics function network element processes the service data of the at least one QoS flow and the network data of the at least one QoS flow of each slice based on the first identity, to obtain second information of each slice, where the second information includes at least network area information.

In a possible implementation, the geographical area information includes one or more of the following information: identity information, at least one cell identity, at least one tracking area identity, at least one routing area identity, and at least one piece of global positioning system GPS information.

In a possible implementation, the network area information includes one or more of the following information of a network area: identity information, at least one cell identity, at least one tracking area identity, at least one routing area identity, and at least one piece of GPS information.

In a possible implementation, the time information includes one or more of the following information: a time stamp, a time window, a time interval, and a time period.

According to a third aspect, an embodiment of this application provides a slice information processing method, including: sending, by an application network element, a third request to a policy management and control network element corresponding to a slice, where the third request includes one or more of the following information about the slice: identity information, time information, geographical area information, and service requirement information of at least one service; and receiving, by the application network element, a third response from the policy management and control network element, where the third response includes one or more of the following information about the slice: the identity information, the geographical area information, and service response information of the at least one service in the slice.

In a possible implementation, the service requirement information includes one or more of a service identity, a first data value of service experience, a first data value of a total quantity of services, a first data value of a percentage of a quantity of services satisfying the first data value of service experience, and network quality requirement information, where the network quality requirement information includes one or more of the following information: a first data value of a bandwidth, a first data value of a delay, a first data value of a packet loss rate, and a first data value of jitter.

In a possible implementation, the service response information includes one or more of the following information about the service: a service identity, a second data value of a total quantity of services, a second data value of a percentage of a quantity of services satisfying the first data value of service experience, and network quality response information, where the network quality response information includes one or more of the following information: a second data value of a bandwidth, a second data value of a delay, a second data value of a packet loss rate, and a second data value of jitter.

In a possible implementation, the method provided in this embodiment of this application further includes: sending, by the application network element, a fourth request to the policy control network element, where the fourth request is used to establish a service of a terminal in a slice, and the fourth request includes one or more of the following information: identity information of the slice, a service identity of the service, a service experience range requirement of the service, a service experience requirement of the service, time information, identity information of the terminal, and geographical area information of the terminal.

For example, the identity information of the terminal in this embodiment of this application may be one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity (IMEI), an IP 5-tuple, and a mobile subscriber international integrated services digital network number (MSISDN). For identity information of a terminal in the following embodiments, refer to the description herein. Details are not described below again.

According to a fourth aspect, this application provides a slice information processing apparatus. The slice information processing apparatus can implement the method according to any one of the first aspect or the possible implementations of the first aspect, and therefore can further implement beneficial effects according to any one of the first aspect or the possible implementations of the first aspect. The slice information processing apparatus may be a management and control function network element; or may be an apparatus, for example, a chip used in a management and control function network element, that can support the management and control function network element in implementing the method according to any one of the first aspect or the possible implementations of the first aspect. The slice information processing apparatus may implement the foregoing method by using software, hardware, or hardware executing corresponding software.

In a possible example, the slice information processing apparatus provided in the fourth aspect includes: a sending unit, configured to send a first request to a data analytics function network element, where the first request is used to request first information of a slice network including at least one slice, and the first request includes identity information of the at least one slice; and a receiving unit, configured to receive a first response sent by the data analytics function network element, where the first response includes the first information, and the first information is used for at least one of user control or service control of each of the at least one slice.

In a possible implementation, the first request further includes one or more of the following information of each slice: time information, geographical area information, and service requirement information of at least one service, where the service requirement information is used to indicate a requirement of the service.

In a possible implementation, for specific content of the service requirement information, network quality requirement information, user control information, and service control information, refer to the description in the first aspect. Details are not described herein again.

In a possible implementation, the first response further includes the identity information corresponding to each of the at least one slice, and one or more of the following information corresponding to the slice: slice level information, network area information, or time information, where the slice level information is used to indicate a load level or a congestion level of the slice.

In a possible implementation, the first response further includes: network level information of the slice network, where the network level information is used to indicate a load level or a congestion level of the slice network.

In a possible implementation, the first information includes at least one of at least one piece of user control information or at least one piece of service control information corresponding to each slice.

In a possible implementation, the receiving unit is further configured to receive, from the data analytics function network element, the identity information of each of the at least one slice and one or more of the following information corresponding to the slice: geographical area information and service response information of the at least one service, where the service response information is used to indicate service information that is of the slice and that can be satisfied by the network.

It should be understood that for specific content of the service response information and a network quality parameter, refer to the description in the first aspect. Details are not described herein again.

In a possible implementation, when the management and control function network element is a slice management and control network element, the sending unit is further configured to send, to at least one policy management and control network element corresponding to any one of the at least one slice, the identity information of the any one slice, and one or more of the following information corresponding to the any one slice: network area information, time information, or the at least one piece of service control information.

In a possible implementation, the receiving unit is further configured to obtain a second request of a terminal from an access and mobility management function network element, where the second request is used to request network slice instance information of a first slice serving the terminal, and the second request includes identity information of the first slice and network area information of the terminal; and the sending unit is further configured to send a second response to the access and mobility management function network element, where the second response includes the network slice instance information of the first slice; and the network slice instance information of the first slice includes at least one of identity information corresponding to a network slice instance of the first slice or address information of a session management function network element corresponding to a network slice of the first slice.

In a possible implementation, when the slice information processing apparatus is a policy management and control network element, the receiving unit is further configured to receive a third request from an application network element, where the slice information processing apparatus serves a second slice in the at least one slice, and the third request includes one or more of the following information corresponding to the second slice: identity information, time information, geographical area information, and service requirement information of at least one service; and the sending unit is further configured to send a third response to the application network element, where the third response includes one or more of the following information corresponding to the second slice: the identity information, the geographical area information, and service response information of the at least one service; and the service response information is used to indicate service information that is of the slice and that can be satisfied by the network.

In a possible implementation, the receiving unit is further configured to receive a fourth request from the application network element, where the fourth request is used to request to establish a service of the terminal in the second slice, and the fourth request includes one or more of the following information: the identity information of the second slice, a service identity of the service, a service experience range requirement of the service, a service experience requirement of the service, time information, identity information of the terminal, and geographical area information of the terminal.

In another possible example, an embodiment of this application further provides a slice information processing apparatus. The slice information processing apparatus may be a management and control function network element, or may be a chip used in a management and control function network element. The slice information processing apparatus includes a processor and a communications interface, and the communications interface is configured to support the slice information processing apparatus in performing the message/data sending and receiving steps, on a side of the slice information processing apparatus, according to any one of the first aspect or the possible implementations of the first aspect. The processor is configured to support the slice information processing apparatus in performing the message/data processing step, on the side of the slice information processing apparatus, according to any one of the first aspect or the possible implementations of the first aspect. For a specific corresponding step, refer to the description in any one of the first aspect or the possible implementations of the first aspect. Details are not described herein again.

Optionally, the communications interface and the processor of the slice information processing apparatus are coupled to each other.

Optionally, the slice information processing apparatus may further include a memory, configured to store code and data; and the processor, the communications interface, and the memory are coupled to each other.

According to a fifth aspect, this application provides a slice information processing apparatus. The slice information processing apparatus can implement the method according to any one of the second aspect or the possible implementations of the second aspect, and therefore can further implement beneficial effects according to any one of the second aspect or the possible implementations of the second aspect. The slice information processing apparatus may be a data analytics function network element; or may be an apparatus, for example, a chip used in a data analytics function network element, that can support the data analytics function network element in implementing the method according to any one of the second aspect or the possible implementations of the second aspect. The slice information processing apparatus may implement the foregoing method by using software, hardware, or hardware executing corresponding software.

In an example, the slice information processing apparatus provided in the fifth aspect includes: a receiving unit, configured to receive a first request from a management and control function network element, where the first request is used to request first information of a slice network, the slice network includes at least one slice, and the first request includes identity information of the at least one slice; and a sending unit, configured to send a first response to the management and control function network element, where the first response includes the first information, and the first information is used for at least one of user control or service control of each of the at least one slice.

In a possible implementation, the first information includes one or more of the following information about each slice: at least one piece of user control information or at least one piece of service control information.

It should be understood that for specific content of the user control information and service configuration information, refer to the description in the second aspect. Details are not described herein again.

In a possible implementation, the first request further includes one or more of the following information corresponding to each slice: time information, geographical area information, and service requirement information of at least one service, where the service requirement information is used to indicate a requirement of the service.

In a possible implementation, the service requirement information includes a service identity, a first data value of service experience, a first data value of a total quantity of services, a first data value of a percentage of a quantity of services satisfying the first data value of service experience, and network quality requirement information, where the network quality requirement information is used to indicate a network quality parameter required by the service.

In a possible implementation, the network quality requirement information includes one or more of the following information: a first data value of a bandwidth, a first data value of a delay, a first data value of a packet loss rate, and a first data value of jitter.

In a possible implementation, the first response further includes the identity information of each slice, and one or more of the following information corresponding to the slice: network area information and time information.

In a possible implementation, the sending unit is further configured to send, to the management and control function network element, the identity information of the slice and one or more of the following information corresponding to the slice: geographical area information and service response information of the at least one service, where the service response information is used to indicate service information that is of the slice and that can be satisfied by the network.

In a possible implementation, the slice information processing apparatus further includes a processing unit, configured to obtain first data that corresponds to any slice and that is on at least two network elements, where the first data that corresponds to the any slice and that is on the at least two network elements includes a first identity; and the processing unit is configured to obtain, based on the first identity and the first data that corresponds to the any slice and that is on the at least two network elements, second data corresponding to the any slice, where the second data includes at least the first data that corresponds to the any slice and that is on each network element.

In another possible example, according to a fifth aspect, an embodiment of this application further provides a slice information processing apparatus. The slice information processing apparatus may be a data analytics function network element, or may be a chip used in a data analytics function network element. The information processing apparatus includes a processor and a communications interface, and the communications interface is configured to support the slice information processing apparatus in performing the message/data sending and receiving steps, on a side of the slice information processing apparatus, according to any one of the second aspect or the possible implementations of the second aspect. The processor is configured to support the slice information processing apparatus in performing the message/data processing step, on the side of the slice information processing apparatus, according to any one of the second aspect or the possible implementations of the second aspect. For a specific corresponding step, refer to the description in any one of the second aspect or the possible implementations of the second aspect. Details are not described herein again.

Optionally, the communications interface and the processor of the slice information processing apparatus are coupled to each other.

Optionally, the slice information processing apparatus may further include a memory, configured to store code and data; and the processor, the communications interface, and the memory are coupled to each other.

According to a sixth aspect, this application provides a slice information processing apparatus. The slice information processing apparatus can implement the method according to any one of the third aspect or the possible implementations of the third aspect, and therefore can further implement beneficial effects according to any one of the third aspect or the possible implementations of the third aspect. The slice information processing apparatus may be an application network element; or may be an apparatus, for example, a chip used in an application network element, that can support the application network element in implementing the method according to any one of the third aspect or the possible implementations of the third aspect. The slice information processing apparatus may implement the foregoing method by using software, hardware, or hardware executing corresponding software.

In an example, the slice information processing apparatus provided in the sixth aspect includes: a sending unit, configured to send a third request to a policy management and control network element corresponding to a slice, where the third request includes one or more of the following information about the slice: identity information, time information, geographical area information, and service requirement information of at least one service; and a receiving unit, configured to receive a third response from the policy management and control network element, where the third response includes one or more of the following information about the slice: the identity information, the geographical area information, and service response information of the at least one service in the slice.

In a possible implementation, the service requirement information includes one or more of a service identity, a first data value of service experience, a first data value of a total quantity of services, a first data value of a percentage of a quantity of services satisfying the first data value of service experience, and network quality requirement information, where the network quality requirement information includes one or more of the following information: a first data value of a bandwidth, a first data value of a delay, a first data value of a packet loss rate, and a first data value of jitter.

In a possible implementation, the service response information includes one or more of the following information about the service: a service identity, a second data value of a total quantity of services, a second data value of a percentage of a quantity of services satisfying the first data value of service experience, and network quality response information, where the network quality response information includes one or more of the following information: a second data value of a bandwidth, a second data value of a delay, a second data value of a packet loss rate, and a second data value of jitter.

In a possible implementation, the sending unit is further configured to send a fourth request to the policy control network element, where the fourth request is used to establish a service of a terminal in the slice, and the fourth request includes one or more of the following information: the identity information of the slice, a service identity of the service, a service experience range requirement of the service, a service experience requirement of the service, and geographical area information of the terminal In another possible example, a slice information processing apparatus provided in a sixth aspect may be an application network element or a chip used in an application network element. The information processing apparatus includes a processor and a communications interface, and the communications interface is configured to support the slice information processing apparatus in performing the message/data sending and receiving steps, on a side of the slice information processing apparatus, according to any one of the third aspect or the possible implementations of the third aspect. The processor is configured to support the slice information processing apparatus in performing the message/data processing step, on the side of the slice information processing apparatus, according to any one of the third aspect or the possible implementations of the third aspect. For a specific corresponding step, refer to the description in any one of the third aspect or the possible implementations of the third aspect. Details are not described herein again.

Optionally, the communications interface and the processor of the slice information processing apparatus are coupled to each other.

Optionally, the slice information processing apparatus may further include a memory, configured to store code and data; and the processor, the communications interface, and the memory are coupled to each other.

According to a seventh aspect, an embodiment of this application provides a computer-readable storage medium. The computer-readable storage medium stores a computer program or an instruction. When the computer program or the instruction is run on a computer, the computer is enabled to perform the slice information processing method according to any one of the first aspect or the possible implementations of the first aspect.

According to an eighth aspect, an embodiment of this application provides a computer-readable storage medium. The computer-readable storage medium stores a computer program or an instruction. When the computer program or the instruction is run on a computer, the computer is enabled to perform the slice information processing method according to any one of the second aspect or the possible implementations of the second aspect.

According to a ninth aspect, an embodiment of this application provides a computer-readable storage medium. The computer-readable storage medium stores a computer program or an instruction. When the computer program or the instruction is run on a computer, the computer is enabled to perform the slice information processing method according to any one of the third aspect or the possible implementations of the third aspect.

According to a tenth aspect, this application provides a computer program product including an instruction. When the computer program product runs on a computer, the computer is enabled to perform one or more of the first aspect or the possible implementations of the first aspect.

According to an eleventh aspect, this application provides a computer program product including an instruction. When the computer program product runs on a computer, the computer is enabled to perform one or more of the second aspect or the possible implementations of the second aspect.

According to a twelfth aspect, this application provides a computer program product including an instruction. When the computer program product runs on a computer, the computer is enabled to perform one or more of the third aspect or the possible implementations of the third aspect.

According to a thirteenth aspect, this application provides a chip. The chip includes a processor and an interface circuit, the interface circuit is coupled to the processor, and the processor is configured to run a computer program or an instruction, to implement one or more of the first aspect or the possible implementations of the first aspect.

According to a fourteenth aspect, this application provides a chip. The chip includes a processor and an interface circuit, the interface circuit is coupled to the processor, and the processor is configured to run a computer program or an instruction, to implement one or more of the second aspect or the possible implementations of the second aspect.

According to a fifteenth aspect, this application provides a chip. The chip includes a processor and an interface circuit, the interface circuit is coupled to the processor, and the processor is configured to run a computer program or an instruction, to implement one or more of the third aspect or the possible implementations of the third aspect.

Optionally, the chip described in this application may further include at least one memory, and the at least one memory stores the instruction or the computer program.

According to a sixteenth aspect, an embodiment of this application provides a communications system. The communications system includes the slice information processing apparatus according to the fourth aspect or the possible implementations of the fourth aspect, the slice information processing apparatus according to the fifth aspect or the possible implementations of the fifth aspect, and the slice information processing apparatus according to the sixth aspect or the possible implementations of the sixth aspect.

According to a seventeenth aspect, an embodiment of this application provides a slice information processing apparatus. The slice information processing apparatus includes one or more modules, configured to implement the method according to the first aspect, the second aspect, or the third aspect, and the one or more modules may correspond to the steps in the method according to the first aspect, the second aspect, or the third aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

DESCRIPTION OF EMBODIMENTS

Figure 1:
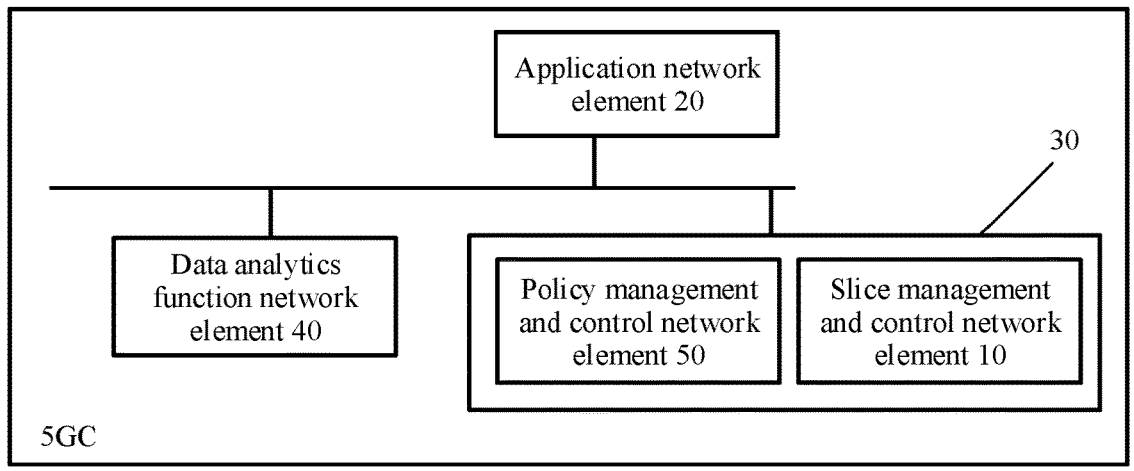
FIG. 1 is a schematic architectural diagram of a communications system according to an embodiment of the present invention.

To clearly describe the technical solutions in the embodiments of this application, terms such as "first" and "second" are used in the embodiments of this application to distinguish between same items or similar items that have basically same functions and purposes. For example, a first slice and a second slice are merely intended to distinguish between different slices, and a sequence of the first slice and the second slice is not limited. A person skilled in the art may understand that the terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

A network architecture and an application scenario that are described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new application scenario, the technical solutions provided in the embodiments of this application are also applicable to a similar technical problem.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

A system architecture and an application scenario described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new application scenario, the technical solutions provided in the embodiments of this application are also applicable to a similar technical problem. In the embodiments of this application, an example in which a provided method is applied to an NR system or a 5G network is used for description.

FIG. 1 is a schematic diagram of a communications system according to an embodiment of this application. The communications system includes a management and control function network element (Control Plane Function, CPF) 30, a data analytics function network element 40, and an application network element 20.

The management and control function network element 30 may be a policy management and control network element 50 or a slice management and control network element 10.

It should be understood that when a terminal may access the system shown in FIG. 1 by using an access network device, a network element (for example, a network slice selection function (NSSF) network element) in a 5G core network (5GC) allocates one or more slices to the terminal. Each slice may include one or more of a UPF network element, an SMF network element, an NRF network element, and a PCF network element. The plurality of slices may share some network functions. A set of the shared network functions may be referred to as a common control network function (CCNF). For example, the CCNF includes either or both of an AMF network element and the NSSF network element. Each slice corresponds to at least one policy management and control network element 50.

It should be understood that the CPF 30, the slice management and control network element 10, the data analytics function network element 40, and the application network element 20 are all network elements in the 5GC.

The CPF 30 is a control plane network element in the 5GC. The data analytics function network element 40 is a network element that has a data analytics function. The slice management and control network element 10 is a network element that manages or controls a slice in the 5GC.

In a possible implementation, one or more of the CPF 30, the slice management and control network element 10, the data analytics function network element 40, and the application network element 20 may be one or more virtual network elements, and the network elements may communicate with each other by using a service-based operation. In another possible implementation, one or more of the CPF 30, the slice management and control network element 10, the data analytics function network element 40, and the application network element 20 may be one or more physical network elements, and the network elements are connected to each other through an existing standardized interface.

It should be understood that the slice management and control network element 10, the data analytics function network element 40, and the management and control function network element 30 may be network elements in the 5GC, or may be OAM network elements. For example, the slice management and control network element 10 or the management or control network element 30 may be an NSSF network element, a network repository function (NRF) network element, a policy control function (PCF) network element, a session management function (SMF) network element, or an access and mobility management function network element (AMF) network element in the 5GC; or may be a network slice selection function (NSMF) network element, a radio access network slice subnet management function (RAN-NSSMF) network element, a core network slice subnet management function (CN-NSSMF) network element, or a transport network slice subnet management function (TN-NSSMF) network element in an OAM system. The data analytics function network element 40 may be a network data analytics function (NWDAF) network element in the 5GC, or may be a management data analytics function (MDAF) network element in the OAM system, or may even be a data analytics network element on a RAN side. The NRF network element may also be referred to as a network element discovery function network element.

It should be understood that the application network element 20 may be an application function (AF) network element, or may be an application server (AS). The AF or the AS may be managed and controlled by an operator, or may be managed and controlled by a third party (for example, a vertical industry). If the AF or the AS is managed and controlled by a third party, the AF or the AS may interact with a 5G network element by using a network exposure function (NEF) network element.

For example, the slice management and control network element 10 is an NSSF network element. The policy management and control network element 50 may be a PCF network element.

The network slice management function (NSMF) network element is responsible for entire life cycle management such as creation, activation, running, deactivation, and deletion of a network slice instance (NSI). The NSMF network element receives a network slice order of a customer, and drives, based on a stored network slice template, a virtualization orchestration and management function unit and a slice control function entity to create a network slice instance.

In a running phase of the network slice instance, for the network slice instance, the NSMF network element creates a performance measurement task, sets a performance measurement threshold, receives performance measurement data, and receives a notification indicating that the performance measurement data exceeds the threshold. The performance measurement task includes measurement of a service key indicator of the network slice instance and measurement of a virtual resource (VR) used by the network slice instance. Specifically, one slice includes several parts such as a radio access network, a transport network, and a core network. Each part may be considered as a subnet of the slice, and is correspondingly managed by one network slice subnet management function (NSSMF). The NSMF network element receives a network slice requirement (including a network slice subnet requirement) generated by a communication service management function (CSMF) based on a service requirement of the customer, converts the received network slice requirement into a network slice subnet requirement, and sends the network slice subnet requirement to the NSSMF. The NSMF network element converts the network slice subnet requirement into a network slice instance requirement that needs to be deployed, and sends the network slice instance requirement to a resource management and orchestration (MANO) domain. After the MANO connects a VNF instance, the NSMF directly configures a service on the VNF instance (that is, a network function entity that can be run) or indirectly configures a service on the VNF instance by using an NFMF, so that the service required by the order of the customer can be normally run on a slice. In this way, the network slice is created.

Network slices are different logical networks customized on a physical or virtual network infrastructure based on different service requirements. One slice may be a complete end-to-end network that includes a terminal, an access network, a transport network, a core network, and a service server, can provide a complete communications service, and has a specific network capability. The network slice may be a communications resource that ensures that a bearer service or a service can satisfy a requirement of a service level agreement (SLA), or may be considered as a combination of a network function and a communications resource that are required to complete a communications service or some communications services.

One network slice instance (NSI) is a really operating logical network, which can satisfy a network feature or service requirement. One complete network slice instance may provide a complete end-to-end network service, and the network slice instance may include one or more network slice subnet instances (NS SI) and one or more network functions (NF).

Figure 2:
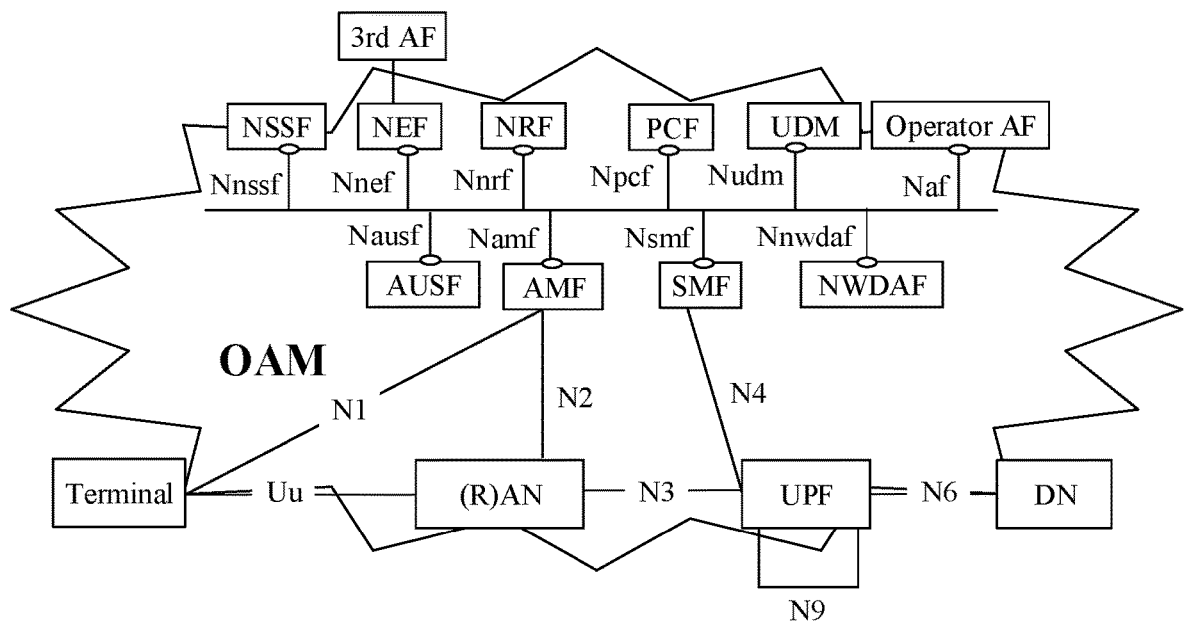
FIG. 2 is a schematic architectural diagram of a 5G network according to an embodiment of the present invention.

In addition, as shown in FIG. 2, the 5G network may further include an AMF network element, a user plane function (UPF) network element, an application function (AF) network element, an access device (for example, an access network (AN)), an authentication server function (AUSF) network element, a network exposure function (NEF) network element, a network repository function (NRF) network element, a data network (DN), an operation, administration and maintenance (OAM) network element (which may also be referred to as an operation, administration, and maintenance network element), and the like. This is not specifically limited in this embodiment of this application.

As shown in FIG. 2, the OAM network element may cover network elements of the access network and the core network, and may collect data from the network elements of the access network and the core network.

The terminal communicates with the AMF network element through an N1 interface (N1 for short). The AMF entity communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates with the data network (DN) through an N6 interface (N6 for short). The terminal accesses a network by using an access device (for example, a RAN device), and the access device communicates with the AMF network element through an N2 interface (N2 for short). The SMF network element communicates with the PCF network element through an N7 interface (N7 for short), and the PCF network element communicates with the AF network element through an N5 interface. The access device communicates with the UPF network element through an N3 interface (N3 for short). Any two AMF network elements communicate with each other through an N14 interface (N14 for short). The SMF network element communicates with a UDM through an N10 interface (N10 for short). The AMF network element communicates with the AUSF through an N12 interface (N12 for short). The AUSF network element communicates with the UDM network element through an N13 interface (N13 for short). The AMF network element communicates with the UDM network element through an N8 interface (N8 for short).

It should be noted that both a 3rd AF network element and an operator AF in FIG. 2 are AF network elements. A difference lies in that the 3rd AF network element (for example, a WeChat service server or an Alipay payment service server) is not managed and controlled by an operator, the operator AF network element (for example, a proxy-call session control function (P-CSCF) network element in an IP multimedia system) is managed and controlled by an operator, and the 3rd AF needs to interact with the NWDAF network element through the NEF network element.

It should be noted that, names of the interfaces between the network elements in FIG. 2 are merely examples, and the interfaces may have other names in a specific implementation. This is not specifically limited in this embodiment of this application.

It should be noted that the access device, the AF network element, the AMF network element, the SMF network element, the AUSF network element, the UDM network element, the UPF network element, the PCF network element, and the like in FIG. 2 are merely names, and the names do not constitute any limitation on the devices. In a 5G network and another future network, network elements corresponding to the access device, the AF network element, the AMF network element, the SMF network element, the AUSF network element, the UDM network element, the UPF network element, and the PCF network element may have other names. This is not specifically limited in this embodiment of this application. For example, the UDM network element may alternatively be replaced with a home subscriber server (HSS), a user subscription database (USD), a database entity, or the like. A general description is provided herein, and details are not described below.

The NWDAF network element is configured to: collect data of a time-varying network, a service, or a terminal, and service experience data corresponding to the service; and obtain, through analysis, at least one set of QoS parameters in different network statuses (corresponding to the network data) or service statuses (corresponding to the service data) or terminal statuses (corresponding to the terminal data) of the service. For example, the NWDAF network element may collect air interface flow bit rate data (a data value, a size, a requirement, and the like) of a service from a base station, and obtain a GFBR through analysis. Alternatively, the NWDAF network element may collect delay data (a data value, a size, a requirement, and the like) of a service between a base station and the UPF, and obtain a PDB through analysis. Alternatively, the NWDAF may collect TCP congestion window (CWND) data (a data value, a size, a requirement, and the like) or TCP receiver window (RWND) data (a data value, a size, a requirement, and the like) on the AF network element or the terminal, and obtain a recommended CWND or RWND through analysis. Alternatively, the NWDAF may collect jitter buffer data on the AF network element or the terminal, and obtain a recommended jitter buffer through analysis.

Figure 3:
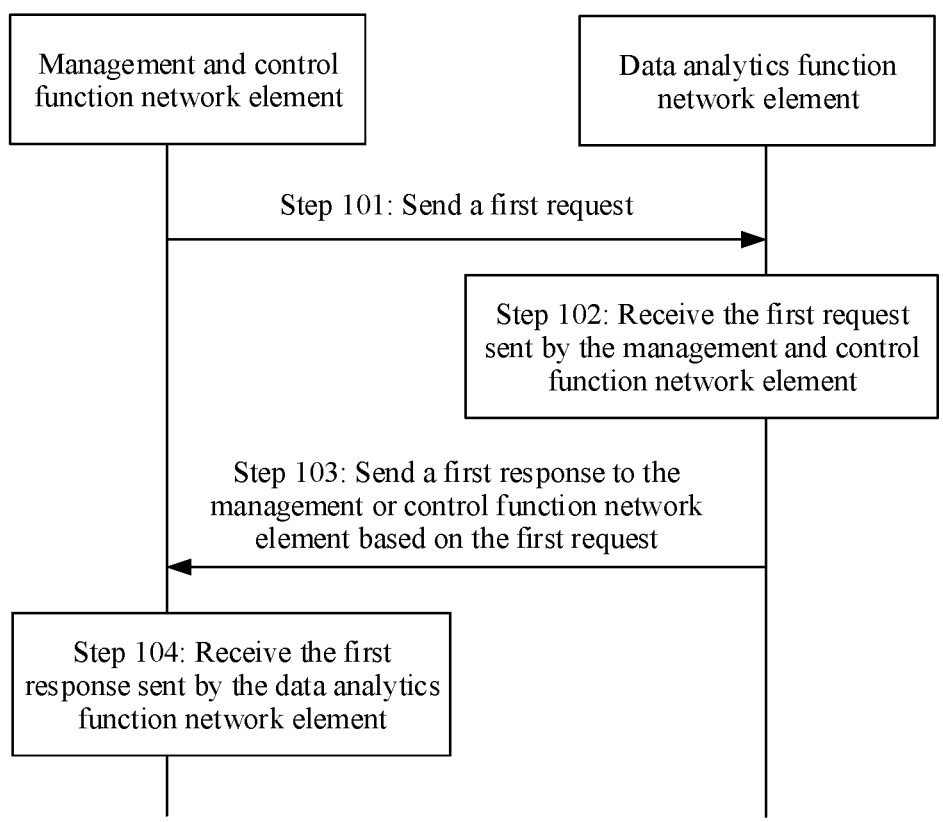
FIG. 3 is a first schematic flowchart of a slice information processing method according to an embodiment of this application.

FIG. 3 is a schematic flowchart of a slice information processing method according to an embodiment of this application. The method includes the following steps.

Step 101: A management and control function network element sends a first request to a data analytics function network element, where the first request is used to request first information of a slice network including at least one slice, and the first request includes identity information of the at least one slice.

It should be understood that the identity information of the at least one slice includes identity information of each of the at least one slice.

It should be understood that after the management and control function network element receives a slice requirement sent by an application network element, the management and control function network element performs step 101.

For example, the slice requirement may be a quality of experience (QoE) requirement, and the QoE requirement includes the identity information of the slice.

In a possible implementation, the first request further includes one or more of the following information of each slice: time information, geographical area information, and service requirement information of at least one service, where the service requirement information is used to indicate a requirement of the service.

The geographical area information is used to identify a physical area in which a service in the slice is located.

For example, the service requirement information includes a service identity, a first data value of service experience, a first data value of a total quantity of services, a first data value of a percentage of a quantity of services satisfying the first data value of service experience, and network quality requirement information, where the network quality requirement information is used to indicate a network quality parameter required by the service.

For example, the network quality requirement information includes one or more of the following information: a first data value of a bandwidth, a first data value of a delay, a first data value of a packet loss rate, and a first data value of jitter. For example, a first data value of a bandwidth corresponding to one service is 1.5 MB.

For example, the identity information of the slice may be network slice selection assistance information (NSSAI).

For example, Table 3 shows partial content of the QoE requirement of the slice.

TABLE 3

| Information element | Description |
| --- | --- |
| NSSAI | Slice identity |
| Geographical Area ID | Identifies a geographical area |
| Application Requirement list | Service requirement list |
| >Application ID | Service identity |
| >Service MOS Requirement | Service experience requirement, for example, a MOS ≥ 3.0 |
| Total quantity of services | Total quantity of services using a service with the service identity, for example, 10000 |
| >How many percentage UEs' experience satisfy | Percentage of a quantity of terminals satisfying the service experience requirement, namely, a value obtained by dividing the total quantity of services by a quantity of services whose service MOSs for the service are greater than or equal to 3.0 |
| >Service requirement | Service requirement raised by a tenant |
| >>Bandwidth requirement | For example, 1.5 MB |
| >>Delay requirement | For example, 100 ms |

It should be understood that Table 3 merely lists the content of the QoE requirement of the slice as an example. In practice, the QoE requirement of the slice may further include more content than that in Table 3, or less content than that in Table 3.

For example, a service identity of one slice is used to identify a service in the slice. A first data value of service experience of one slice may be a Service MOS Requirement, used to indicate a service experience requirement of the slice.

For example, the first data value of service experience may be MOS≥3.0, or the first data value of service experience may be any one or more of [0, 3.0], [3.0, 3.5], [3.5, 4.0], and [4.0, 5.0]. It should be understood that only the first data value of service experience is listed herein.

A first data value of a total quantity of services in one slice is used to indicate the total quantity of services in the slice. For example, a first data value of a total quantity of services in a slice A is 10000.

A first data value of a percentage of a quantity of users satisfying a first data value of service experience in one slice indicates a percentage of the quantity of users satisfying the first data value of service experience in the slice to a total quantity of services in the slice. For example, the first data value of the percentage of the quantity of services satisfying the first data value of service experience may be that a percentage of a quantity of services whose MO≥3.0 is greater than or equal to 90%.

Step 102: The data analytics function network element receives the first request sent by the management and control function network element.

Step 103: The data analytics function network element sends a first response to the management and control function network element based on the first request, where the first response includes the first information, and the first information is used for at least one of user control or service control of each of the at least one slice.

Specifically, step 103 may be implemented in the following manner:

Step 1: After one slice is deployed, a service in the slice starts to be run in an initial slice network. In a running process, the data analytics function network element generates a plurality of sets of quality of service QoS parameters of each of at least one service corresponding to the slice. Each set of QoS parameters includes one or more of a guaranteed flow bit rate (GFBR), a packet delay budget (PDB), a packet error rate (PER), an maximum packet loss rate (Max PLR), an average window size (AWS), and the like.

Specifically, step 1 may be implemented in the following manner:

Step 11: The data analytics function network element may separately collect service data of a quality of service flow (QoS flow) level from an AF network element, and obtain network data from a network element (for example, a RAN, an AMF network element, an SMF network element, or a UPF network element).

For example, the service data in this service may be data of a parameter such as a bandwidth, a delay, a packet loss rate, a jitter buffer, a transmission control protocol (TCP) congestion window, a TCP receiver window, a media encoding type, or a media encoding rate.

It may be understood that, in this embodiment of this application, data of a parameter may be a size, a value, or a requirement of the parameter. For example, CQI data may be a size or a value of a CQI. In this embodiment of the present invention, data, a size, a value, or a requirement of a parameter indicates a data value collected or obtained from a corresponding network element for the parameter. For such type of description below, refer to the description herein. Details are not described below again.

The network data in this application may be parameter data of any one of the following parameters: a bandwidth, a delay, a packet loss rate, reference signal received power (RSRP), reference signal received quality (RSRQ), a block error rate (BLER), a channel quality indicator (CQI), slice identity information, and a data network name (DNN).

For example, the service data may be shown in Table 4, and the network data may be shown in Table 5.

Figure 4:
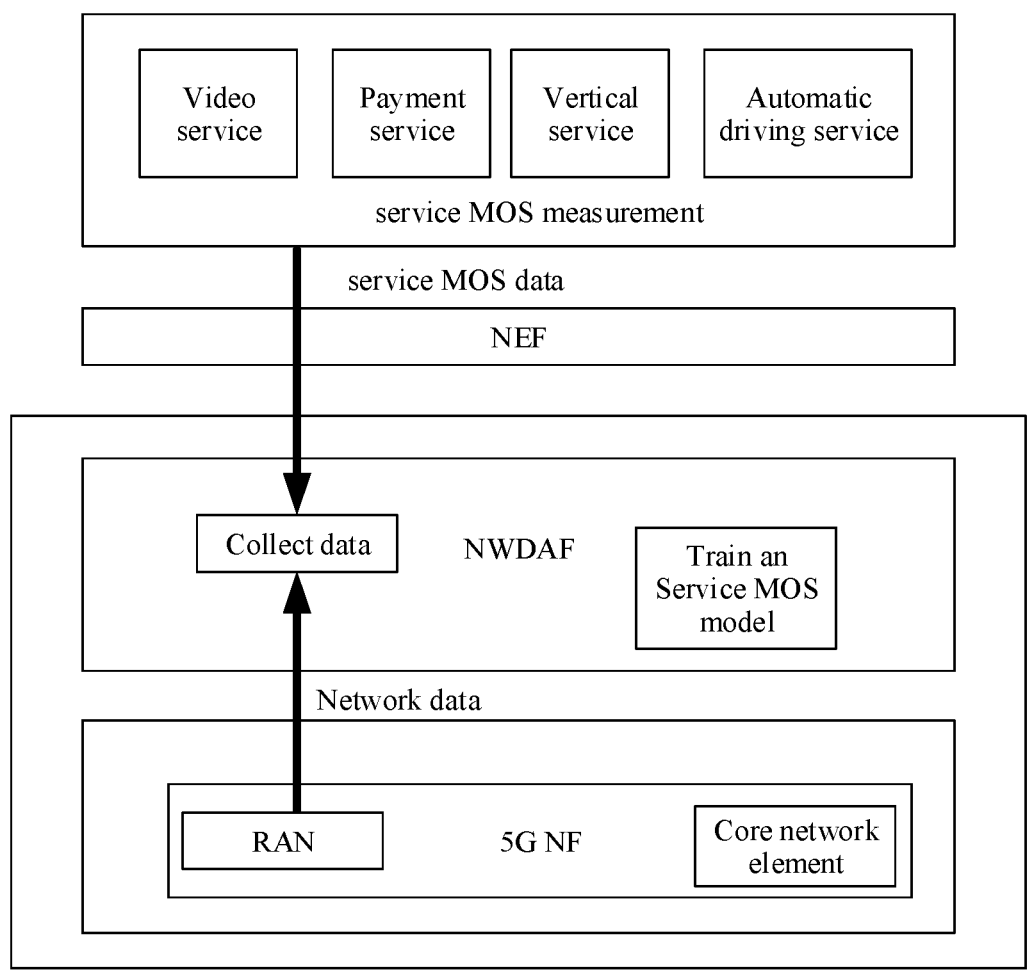
FIG. 4, FIG. 5, FIG. 6, and FIG. 7A and FIG. 7B are schematic data analysis diagrams according to embodiments of this application.

Specifically, as shown in FIG. 4, the data analytics function network element obtains, by using the AF network element, service data corresponding to one or more services such as a video service, a payment service, an automatic driving service, and a vertical service. As shown in FIG. 4, the data analytics function network element may obtain network data from a 5G NF.

For example, Table 4 shows an example of data content from tenant service experience data, and Table 5 shows an example of content of the network data from the 5G NF. For details, refer to the following Table 4 and Table 5.

TABLE 4

Service data from the tenant service experience data

| Information | Parameter value | Source | Description |
| --- | --- | --- | --- |
| Correlation identity (Correlation ID) | M | AF network element | |
| Application ID | M | | Service identity |
| Geographical area identity (geographical Area ID) | M | | Identifies a geographical area |
| Service MOS | M | | |

TABLE 5

Network data from the 5G NF

| Information | Description |
| --- | --- |
| Correlation identity (Correlation ID) | |
| Application ID | Service identity |
| Quality of service flow identifier QFI | Identifier of a quality of service flow |
| Cell ID | Identifies a cell that provides a service |
| QoS flow bit rate | Parameter of the quality of service flow, for example, a GFBR |
| QoS flow Packet Delay Budget | Parameter of the quality of service flow, for example, a PDB |
| QoS flow Packet Error Rate | Parameter of the quality of service flow, for example, a PER |
| Network data X4 | Network data X4 |
| Network data X5 | Network data X5 |

Step 12: The data analytics function network element analyzes the network data and the service data to obtain a service MOS model of each service in the slice.

Step 13: The data analytics function network element obtains, based on a service requirement (that is, a MOS range is, for example, [3.0, 4.0], [4.0, 4.5], and [4.5, 5.0]) and the service MOS model of each service, at least one set of quality of service QoS parameters of different service experience ranges corresponding to the service.

Step 2: The data analytics function network element obtains, through mapping by using a correlation ID and based on a geographical area identity (ID) of a QoS flow in the service data and a cell ID in the network data, a correspondence that is in the AF network element and that is between a geographical area and a network area (for example, a cell identity list (Cell ID list)) in which all services in the slice are located.

Step 3: The data analytics function network element obtains, through analysis, service monitoring information of the slice in the geographical area, user control information of the slice in the network area, and service control information of the slice.

For example, the first information includes at least one piece of user control information and/or at least one piece of service control information corresponding to each slice.

The user control information includes at least one of network area information and at least one piece of network slice instance information, and the network slice instance information includes identity information of a network slice instance and a maximum quantity of users.

The service control information includes at least one of network area information and at least one piece of network slice instance information, and the network slice instance information includes identity information of a network slice instance and at least one piece of service configuration information. The service configuration information includes a service identity, a maximum quantity of users having the service identity, and at least one piece of service experience range information of the service. The service experience range information includes a size of a service experience range, a maximum quantity of users within the service experience range, and at least one set of quality of service QoS parameters of the service experience range.

There is at least one set of QoS parameters for a service, because for example, in consideration of a service experience requirement (for example, a service MOS is greater than 3.0) for a vertical industry, packet delay data conflicts with packet loss rate data.

In an example 1, within weak coverage, a RAN may transmit packets for several times to ensure a packet loss rate. However, in this case, a packet delay is increased, and further, a flow bit rate may be increased.

In an example 2, within strong coverage, a RAN does not need to transmit packets for several times. In this case, both a packet loss rate and a packet delay can be ensured, and further, a flow bit rate may be reduced. Therefore, there are one or more sets of QoS parameters for one service.

Specifically, the data analytics function network element obtains at least one set of QoS parameters of the service by using a big data method based on data of a time-varying network, the service, or a terminal, and service experience data corresponding to the service. For a specific process, refer to step A and step B.

Step A: The data analytics function network element obtains the service data from the AF network element, collects the network data from network elements such as the RAN device, the UPF network element, UE, the AMF network element, the SMF network element, and a PCF network element; and then associates data of the network elements by using information such as a service identity, an identity of a service flow, a terminal identity, an identity of a session in which the service flow is located, an association identity on each network element, and a time, to obtain complete training data. The training data includes:

(1) the service experience data that is from the AF network element; and (2) other time-varying parameter data that affects the service experience data and that includes:

a. TCP congestion window data, TCP receiver window data, jitter buffer data, media encoding type and encoding rate data, buffer data, and data of at least one data type that are from the AF network element;

b. flow bit rate data, packet loss rate data, delay data, radio channel quality data, and data of at least one data type that are from the RAN network element;

c. flow bit rate data, packet loss rate data, delay data, and data of at least one data type that are from the UPF network element;

d. flow bit rate data, packet loss rate data, delay data, data of at least one data type, TCP congestion window data, TCP receiver window data, jitter buffer data, media encoding type and encoding rate data, buffer data, CPU usage, memory usage, and data of at least one data type that are from the UE; and the like.

Step B: An NWDAF network element obtains, according to a linear regression method, a relational model, namely, a service experience model, between service experience and the other time-varying parameter data that affects the service experience data, and the NWDAF network element can plan the one or more sets of QoS parameters for the service based on the service experience model.

For example, Table 6 shows service monitoring information that is of the slice in the geographical area and that is carried in the first request:

TABLE 6

| Content of the service monitoring information | |
| --- | --- |
| Information element | Description |
| NSSAI | Slice identity |
| Geographical Area ID | Identifies a geographical area |
| Application monitoring list | Service monitoring list |
| >Application ID | Service identity |
| >Service MOS Requirement | Application experience requirement, for example, a MOS ≥ 3.0 |
| Total quantity of services | Total quantity of services using a service corresponding to the application ID in the slice. For example, the total quantity of services is greater than or equal to 10000. |
| >how many percentage UEs' experience satisfy | Percentage of a quantity of users satisfying the service experience requirement, namely, a value obtained by dividing the total quantity of users by a quantity of users whose service MOSs for the service are greater than or equal to 3.0 |
| Service satisfaction status | Service requirement raised by a tenant |
| >>Monitored bandwidth value | For example, 1.0 MB |
| >>Monitored delay value | For example, 90 ms |

For example, Table 7 shows content of the user control information:

TABLE 7

| User control information | |
| --- | --- |
| Information element | Description |
| Time window | A time window in a network area |
| Network area (Cell ID or Cell ID) | Network area identity |
| Cell-level UE registration control information | |
| >Cell ID | Identifies a cell |
| >>S-NSSAI | Slice identity |
| >>>NSI ID | Identifies a slice instance |
| >>>Quantity of registered users in the slice instance | Maximum quantity of users in the slice instance |

For example, Table 8 shows content of the service control information:

TABLE 8

| Service control information | |
| --- | --- |
| Information element | Description |
| Time window | A time window in a network area |
| Network area (Cell ID or Cell ID) | Network area identity |
| Cell-level UE registration control information | |
| >Cell ID | Identifies a cell |
| >>S-NSSAI | Slice identity |
| >>>NSI ID | Identifies a slice instance |

TABLE 8-continued

| Service control information | |
| --- | --- |
| Information element | Description |
| >>>>Application ID | Identifies a service |
| >>>>Number of users for application | Indicates a maximum quantity of services for a service in the slice instance of the slice in the cell, namely, a quantity of services who can be accommodated in the cell |
| >>>>Number of users whose service MOS ∈[0, 3.0] | Quantity of services whose service MOSs ∈[0, 3.0] and that can be accommodated in the cell |
| >>>>Number of users whose service MOSe ∈[3.0, 4.0] | Quantity of services whose service MOSs ∈[3.0, 4.0] and that can be accommodated in the cell |
| >>>>Number of users whose service MOS ∈[4.0, 5.0] | Quantity of services whose service MOSs ∈[4.0, 5.0] and that can be accommodated in the cell |
| >>>>percentage of service MOS ≥ 3.0 | Percentage of a quantity of services whose service MOSs are greater than or equal to 3.0 to the quantity of services who can be accommodated in the cell |

For example, the service experience range may be a MOS∈[0, 3] and [3.0, 4.0] in Table 8, and a maximum quantity of services within the service experience range may be a quantity of services who can be accommodated in the cell and whose MOSs∈[4.0, 5.0] in Table 8.

For example, in this embodiment of this application, the data analytics function network element may obtain a corresponding MOS during running of a service in the following manner:

Step 1: The data analytics function network element obtains a service MOS model based on service data and network data. The service MOS model is used to represent a relationship between service experience (namely, a service MOS) and the network data.

Figure 5:
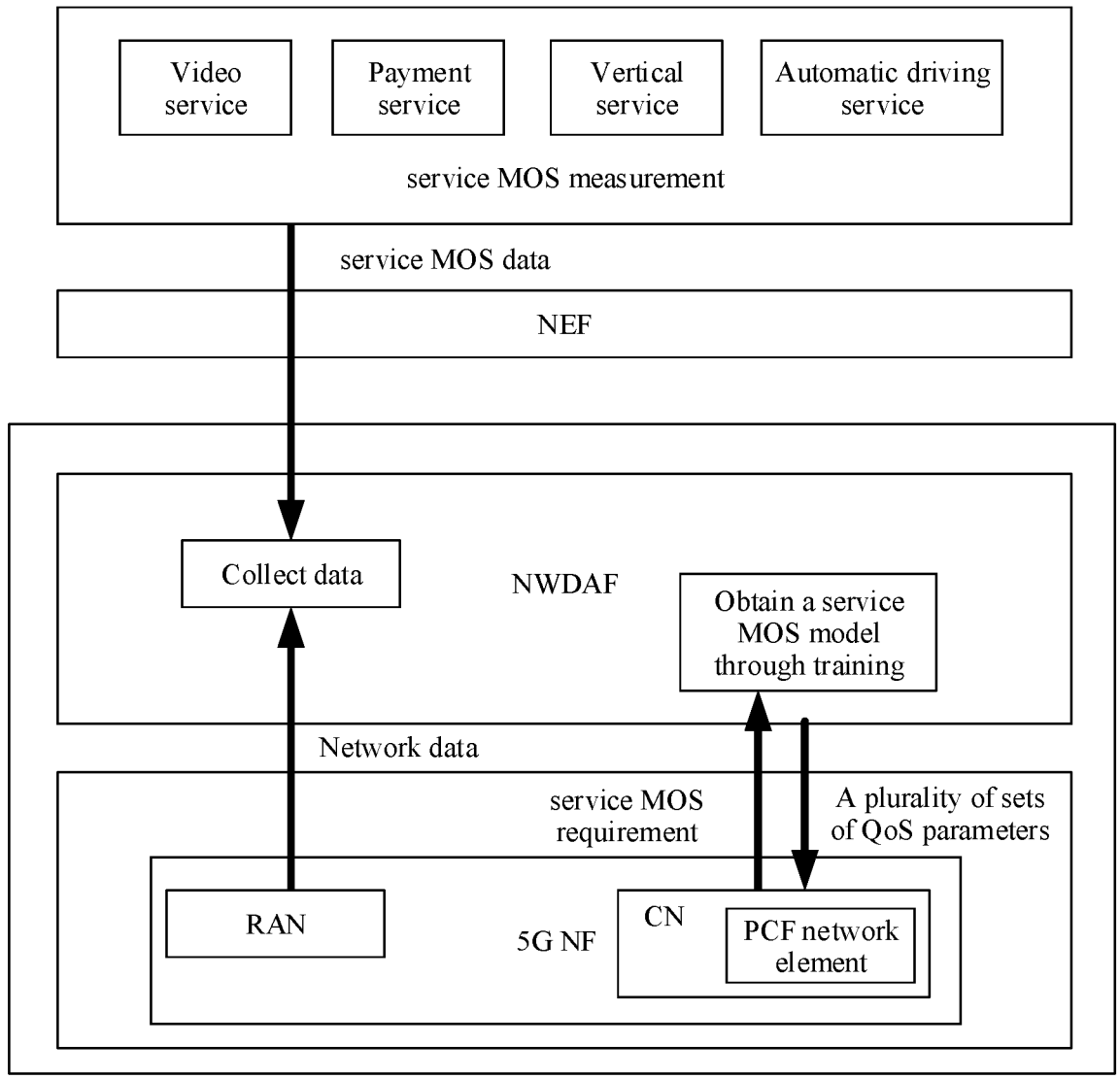

It should be understood that, as shown in FIG. 5, the data analytics function network element may obtain the service data of a QoS flow level from the AF network element, and obtain the network data from the network element (for example, the RAN, the AMF network element, the SMF network element, or the UPF network element) in the 5GC, to obtain the service MOS model through training.

For example, the data analytics function network element may obtain the service MOS model according to the following formula (1):

$$H(x) = W0X0 + W1X1 + W2X2 + W3X3 + W4X4 + W5X5 + \ldots + WnXn \quad (1)$$

With reference to Table 6, X is a variable, X1 may be a GFBR, X2 may be a PDB, X3 is a PER, X4 is network data X4, and X5 is network data X5. Wn represents a weight of an nth variable, n represents a quantity of variables, Xn represents the nth variable, n is an integer greater than or equal to 1, and H(x) represents the service MOS model.

Step 2: The data analytics function network element obtains a QoS parameter recommendation of the service based on a MOS requirement of the service and the service MOS model.

Specifically, the MOS requirement of the service indicates a requirement of a tenant, or may be understood as a QoE requirement. For example, a MOS is greater than or equal to 3.0.

For example, according to the formula (1) and H(x)≥3.0, the following matrix (1) may be obtained:

$$\begin{Bmatrix} GFBR_1 & PDB_1 & PER_1 & X4\_1 & X5\_1 & \dots \\ GFBR_2 & PDB_2 & PER_2 & X4\_2 & X5\_2 & \dots \\ \dots & \dots & \dots & \dots & \dots \\ GFBR_N & PDB_N & PER_N & X4\_N & X5\_N & \dots \end{Bmatrix} \quad \text{Matrix (1)}$$

Each row in the matrix (1) represents a set of QoS parameters.

The QoS parameter recommendation of the service includes a plurality of sets of QoS parameters. Each set of QoS parameters includes values of parameters such as a GFBR, a PDB, and a PER.

Step 3: The data analytics function network element may obtain, based on the service MOS model and the network data, the corresponding MOS during running of the service. That is, the data analytics function network element may obtain the MOS through calculation by inputting the network data into the service MOS model, as shown in the following Table 9:

TABLE 9

| Information | Description |
|---|---|
| Correlation identity (Correlation ID) | |
| Application ID | Service identity |
| Quality of service flow identifier QFI | Identifier of a quality of service flow |
| Cell ID | Identifies a cell that provides a service |
| QoS flow bit rate | Parameter of the quality of service flow, for example, a GFBR |
| QoS flow Packet Delay Budget | Parameter of the quality of service flow, for example, a PDB |
| QoS flow Packet Error Rate | Parameter of the quality of service flow, for example, a PER |
| Network data X4 | For example, 0 to 1 |
| Network data X5 | For example, 0 to 1 |

For example, the data analytics function network element may obtain, based on the service MOS model and the network data X4 (or the network data X5), that a corresponding MOS during running of the service is 0 to 1.

Step 104: The management and control function network element receives the first response sent by the data analytics function network element, where the first response includes the first information. For example, the first information includes the at least one piece of user control information and/or the at least one piece of service control information corresponding to each slice.

Optionally, in another embodiment of this application, the data analytics function network element in this embodiment of this application is further configured to obtain slice level information, used to indicate a load level or a congestion level of the slice.

When the management and control function network element is a slice management and control network element, the method provided in this embodiment of this application further includes: sending, by the data analytics function network element to the management and control function network element, the identity information corresponding to each of the at least one slice, and one or more of the following information corresponding to the slice: slice level information, network area information, or time information. Then, the management and control function network element controls registration and access of a terminal in each slice based on a quantity of registered terminals in the slice. The management and control function network element sends the slice load level information of each slice (excluding a quantity of registered terminals in an area) to a policy control network element based on a cell granularity, and then the policy control network element controls, based on the slice load level information of the cell granularity, a MOS range of a service during establishment and running of the service, where the PCF controls a MOS range of each service based on a QoS parameter of the service.

For example, the slice level information includes a slice load level ID, a cell ID, a quantity of registered users, a service identity of each service, a quantity of users, and a quantity of services corresponding to each service experience range.

Specifically, the identity information corresponding to each of the at least one slice, and one or more of the following information corresponding to the slice: the slice level information, the network area information, or the time information may be carried in the first response.

Optionally, the method provided in this embodiment of this application further includes: sending, by the data analytics function network element, network level information of the slice network to the management and control function network element, where the network level information is used to indicate a load level or a congestion level of the slice network. The network level information of the slice network is sent. When a network level is less than a first threshold, it indicates that load of the slice network is less than a second threshold or the slice network is not congested. In this case, the management and control function network element may indicate an OAM network element to add a slice or indicate the PCF network element to transmit background traffic in the slice network.

The first threshold and the second threshold are not limited in this embodiment of this application, and may be set as required.

Specifically, the network level information of the slice network may be carried in the first response.

Optionally, the first response further includes the identity information of each slice, and one or more of the following information corresponding to the slice: network area information or time information. As a part of a data analysis result, the time information is mainly used to reflect user access information and service control information of the slice at different times. Further, the user access information and the service control information that can be accommodated by the network during idle hours are different from those during busy hours.

In a possible implementation, the data analytics function network element may obtain the slice level information in the following manner:

Step 4: The data analytics function network element obtains a service distribution model in an area.

Figure 6:
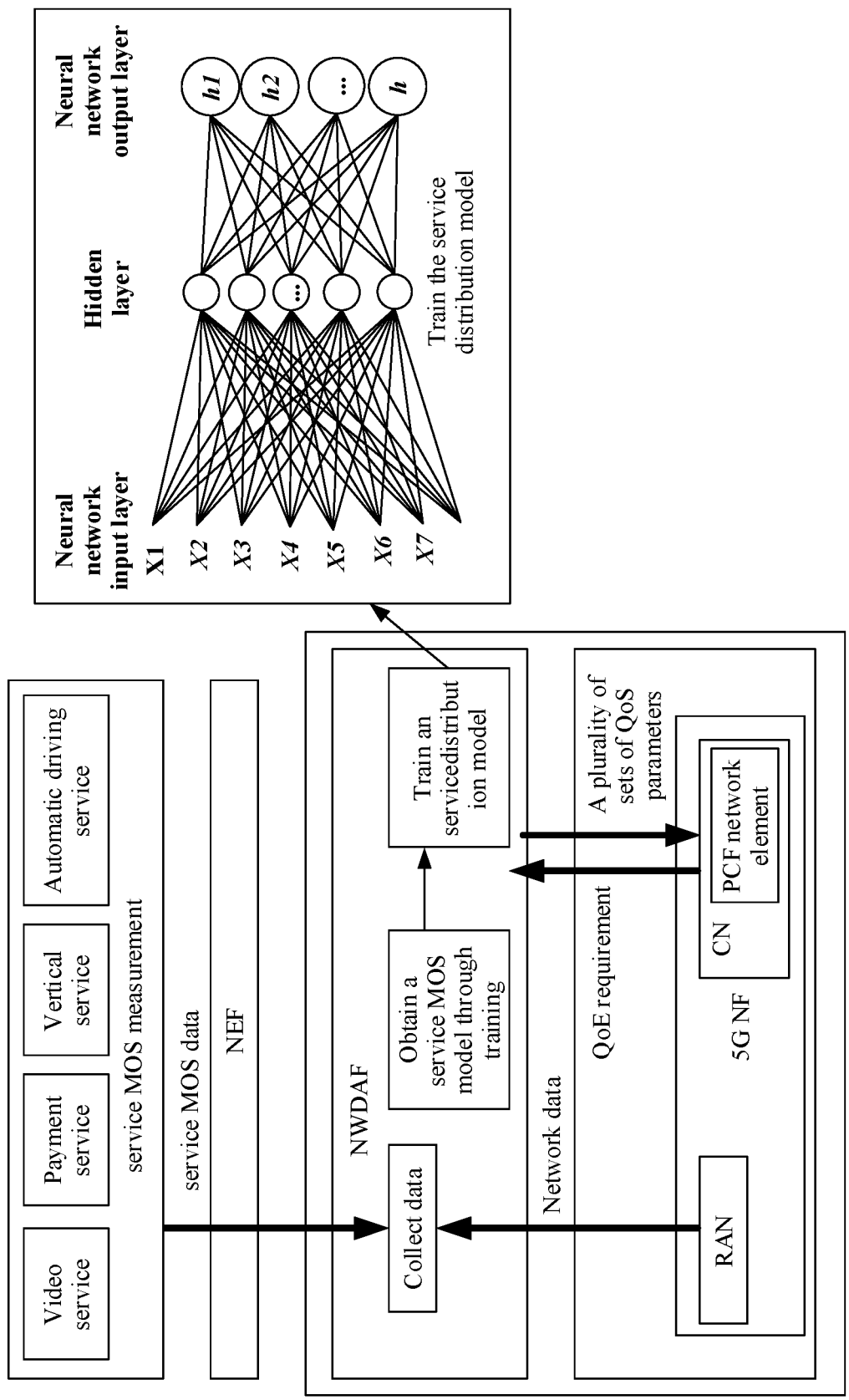

As shown in FIG. 6, the data analytics function network element obtains service data and network data, and then obtains a service MOS model by performing the foregoing step 1.

A schematic diagram of a training process of the service distribution model (for example, a recurrent neural network, Recurrent Neural Network, RNN) is shown in FIG. 6. The service distribution model in FIG. 6 includes a neural network input layer, a hidden layer, and a neural network output layer.

Specifically, for input parameters of the neural network input layer and output parameters of the neural network output layer in the training process of the service distribution model, refer to the following Table 10 and Table 11.

TABLE 10

Input parameters of a service distribution model algorithm

| Information | Description | Neural network input layer |
|---|---|---|
| Region Information, for example, a cell ID or a cell ID list | Identifies a network area | |
| Time window | Identifies a time window | |
| Cell ID | Identifies a cell in the network area | |
| Slice A | Slice A | |
| >S-NSSAI | Slice identity | |
| >Network slice instance list | Network slice instance list | |
| >>NSI 1 | Network slice instance 1 | |
| >>Number of active PDU Sessions per network slice instance | | $x_1$ |
| >>>Application 1 | Service 1 | |
| >>>>Application ID 1 | Identity of the service 1 | |
| >>>>Number of users for application 1 | Quantity of users of the service 1 | $x_2$ |
| >>>>Number of users whose service MOS $\epsilon$[0, 3.0] | Quantity of services whose MOSs $\epsilon$[0, 3.0] | $x_3$ |
| >>>>Number of users whose service MOS $\epsilon$[3.0, 4.0] | Quantity of services whose MOSs $\epsilon$[3.0, 4.0] | $x_4$ |
| >>>>Number of users whose service MOS [4.0, 5.0] | Quantity of services whose MOSs $\epsilon$[4.0, 5.0] | $x_5$ |
| >>>>>percentage of service MOS ≥ 3.0 | Percentage of services whose MOSs are greater than or equal to 3.0 | $x_6$ |
| >>>Application 2 | Service 2 | |
| >>>>... | ... | ... |
| >>>Application P | Service P | |
| >>NSI 2 | NSI 2 | |
| ... | ... | ... |
| >>NSI Z | NSI Z | |
| Slice B | Slice B | |
| >... | ... | ... |
| Slice C | Slice C | |
| >... | ... | ... |

It should be understood that Table 10 is merely an example of the input of the service distribution model algorithm. In an actual process, the input of the service distribution model algorithm may further include more or fewer parameters than those in Table 10.

In this embodiment of this application, a quantity of users of a service is a quantity of terminals that use the service, and a quantity of users in a slice is a quantity of terminals that use the slice.

TABLE 11

Output parameters of a service distribution model algorithm

| Information | Description | Neural network output layer |
|---|---|---|
| Region e.g. Cell or Cell list | Identifies a network area | |
| Time window | Identifies a time window | |
| Application 1 | | |
| >how many percent UEs' experience satisfy | Satisfaction of the service 1 in the network area, that is, a percentage of a quantity of services whose MOSs are greater than or equal to 3.0 | $h_1$ |
| Application 2 | | |
| >how many percent UEs' experience satisfy | Satisfaction of the service 2 in the network area, that is, a percentage of a quantity of services whose MOSs are greater than or equal to 3.0 | $h_2$ |

TABLE 11-continued

Output parameters of a service distribution model algorithm

| Information | Description | Neural network output layer |
|---|---|---|
| Information | Description | Neural network output layer |
| | services whose MOSs are greater than or equal to 3.0 | |

Step 5: The data analytics function network element obtains a QoE requirement corresponding to a slice load level.

Step 5 may be specifically implemented in the following manner: The data analytics function network element receives network area information (for example, a cell ID or a cell ID list) and a quantity of slice load levels from an NSSF network element. The data analytics function network element receives a service satisfaction requirement of a tenant from the PCF network element. For example, a percentage of a quantity of services who's MOSs for the service 1 are greater than or equal to 3.0 is 85%.

For example, the quantity of slice load levels is 5, and values of different slice load levels are different. Specific meanings of the different values may be as follows: 1 indicates that the slice is extremely lightly loaded, 2 indicates that the slice is lightly loaded, 3 indicates normal, 4 indicates that the slice is congested, and 5 indicates that the slice is extremely congested.

Figure 7A:
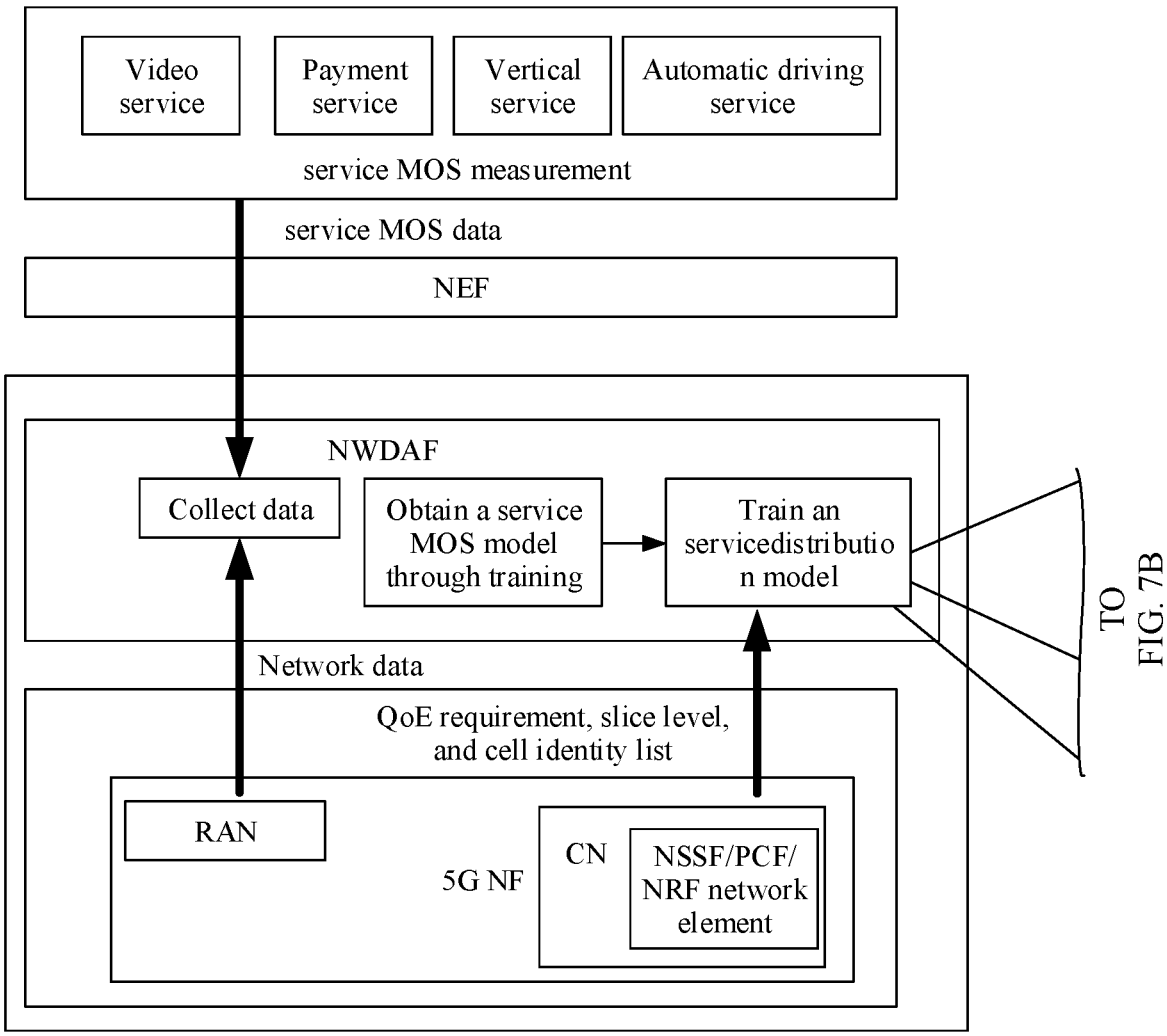
Figure 7B:
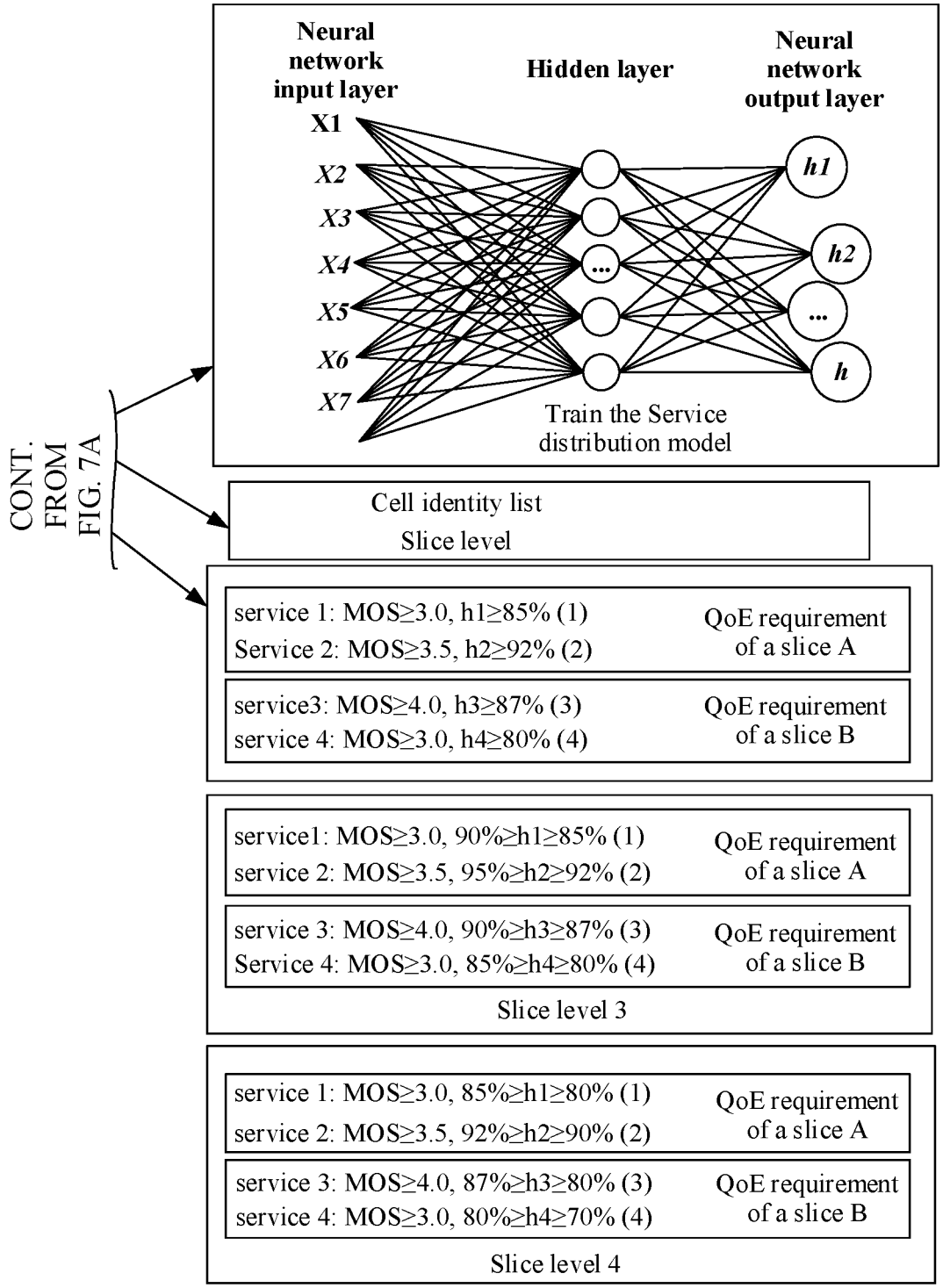

As shown in FIG. 7A and FIG. 7B, the data analytics function network element inputs the obtained QoE requirement, the slice load level, and the network area information into the service distribution model. For example, a slice A has a service 1 and a service 2, and a slice B has a service 3 and a service 4. A slice level corresponding to the service 1 is 1, and a percentage of a quantity of services who's MOSs for the service 1 are greater than or equal to 3.0 is 85%. A slice level corresponding to the service 2 is 2, and a percentage of a quantity of services whose MOSs for the service 2 are greater than or equal to 3.5 is 92%.

A slice level corresponding to the service 3 is 3, and a percentage of a quantity of services whose MOSs for the service 3 are greater than or equal to 4.0 is 87%. A slice level corresponding to the service 4 is 4, and a percentage of a quantity of services whose MOSs for the service 4 are greater than or equal to 3.0 is 80%.

Step 6: The data analytics function network element obtains QoE requirements that are of different services and that correspond to different slice load levels.

Specifically, the data analytics function network element performs a K-Means clustering algorithm based on area-level service information, where a value of K is equal to the quantity of slice load levels, a clustering result is that K centroids are obtained, and each centroid includes service satisfaction of each service in the network area. Then, the data analytics function network element receives the service satisfaction requirement of the tenant from the PCF network element as slice load level=3 (a normal vector), then separately calculates included angles between the K centroids and slice load level=3 (the normal vector), and then determines a QoE requirement range corresponding to slice load level=3.

In another embodiment of this application, the data analytics function network element in this application may further determine, in the following manner, service configuration information corresponding to the slice load level.

Specifically, the data analytics function network element determines, by using the QoE Requirement that corresponds to each slice load level and that is obtained in the foregoing process, slice load level information corresponding to the slice load level, as shown in the following Table 12:

TABLE 12

Slice load level information

| Information | Description | Neural network input layer |
|---|---|---|
| Region Info, e.g. Cell or Cell ID list | Identifies a network area | |
| Time window | Identifies a time window | |
| Load Level ID | Identifies a slice load level | |
| Cell ID | Identifies a cell in the network area | |
| Slice A | | |
| S-NSSAI | | |
| >Network slice instance list | | |
| >>NSI 1 | | |
| >>Number of active PDU Sessions per network slice instance | | $x_1$ |
| >>> Application 1 | | |
| Information | Description | Neural network input layer |
| >>>>Application ID 1 | Identifies a service | |
| >>>>Number of users for application 1 | Quantity of user | $x_2$ |
| >>>>Number of users whose service MOSe [0,3.0] | Quantity of services whose MOSse[0, 3.0] | $x_3$ |
| >>>>Number of users whose service MOSe [3.0, 4.0] | Quantity of services whose MOSse[3.0, 4.0] | $x_4$ |
| >>>>Number of users whose service MOSe [4.0, 5.0] | Quantity of services whose MOSse[4.0, 5.0] | $x_5$ |
| >>>>percentage of service MOS>3.0 | Percentage of services whose MOSs are greater than or equal to 3.0 | $x_6$ |
| >>> Application 2 | Service 2 | |
| >>>> . . . | . . . | . . . |
| >>> Application P | Service P | |
| >>NSI 2 | NSI2 | |
| . . . | . . . | . . . |
| >>NSI Z | NSIZ | |
| Slice B | Slice B | |
| >. . . | . . . | . . . |
| Slice C | Slice C | |
| >. . . | | . . . |

Figure 8:
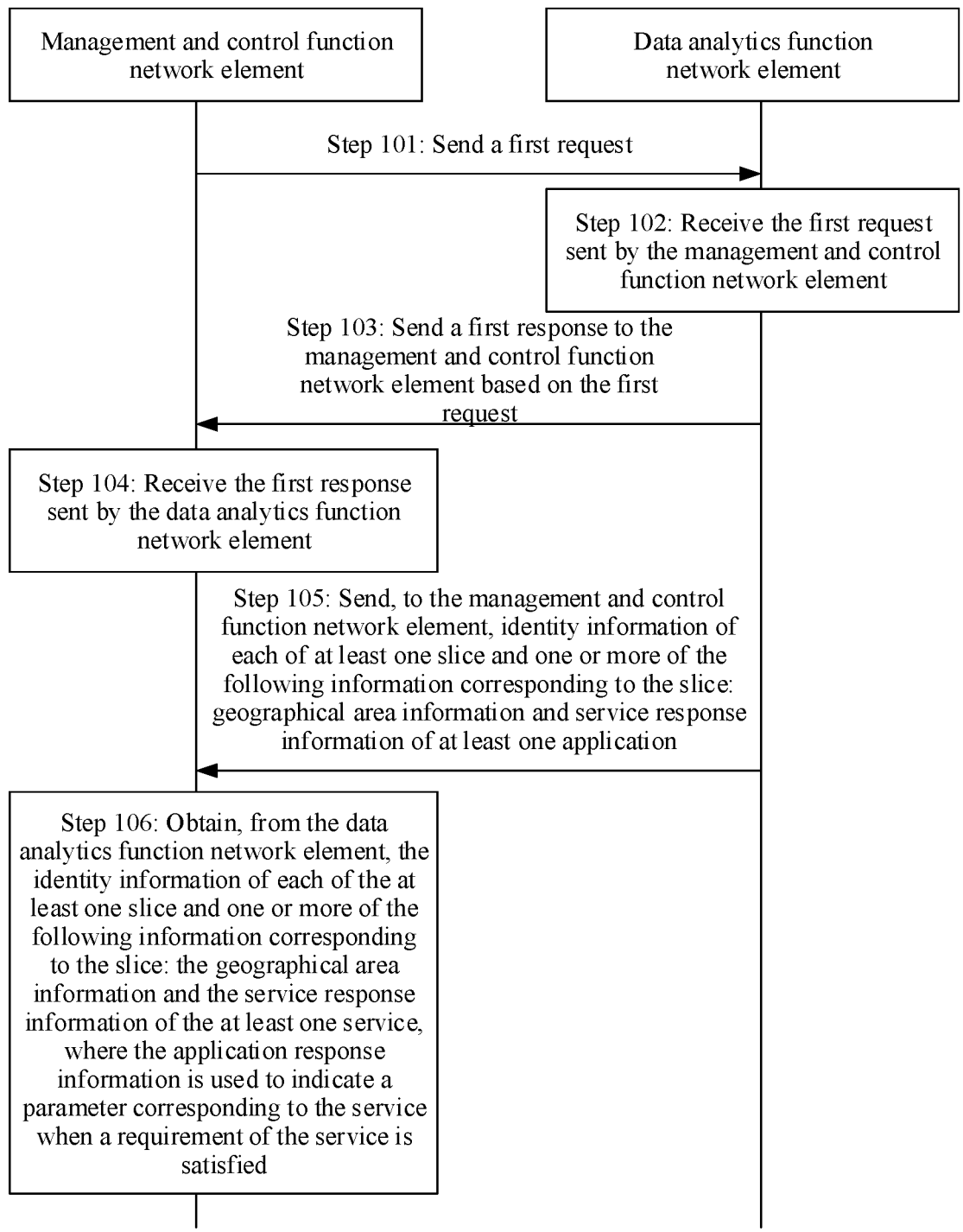
FIG. 8 is a second schematic flowchart of a slice information processing method according to an embodiment of this application.

As shown in FIG. 8, in another embodiment of this application, the method provided in this embodiment of this application further includes the following steps.

Step 105: The data analytics function network element sends, to the management and control function network element, the identity information of each of the at least one slice and one or more of the following information corresponding to the slice: the geographical area information and service response information of the at least one service, where the service response information is used to indicate a parameter corresponding to the service when a requirement of the service is satisfied.

Step 106: The management and control function network element obtains, from the data analytics function network element, the identity information of each of the at least one slice and one or more of the following information corresponding to the slice: the geographical area information and the service response information of the at least one service, where the service response information is used to indicate the parameter corresponding to the service when the requirement of the service is satisfied.

For example, the service response information includes a service identity and one or more of the following information corresponding to the service:

a second data value of a total quantity of users, a second data value of a percentage of a quantity of services satisfying the first data value of service experience, and a network quality parameter.

For example, the network quality parameter includes one or more of a second data value of a bandwidth, a second data value of a delay, a second data value of a packet loss rate, and a second data value of jitter.

Specifically, after performing step 106, the management and control function network element may send, to the application network element, the identity information of each of the at least one slice and the one or more of the following information corresponding to the slice: the geographical area information and the service response information of the at least one service, where the service response information is used to indicate the parameter corresponding to the service when the requirement of the service is satisfied.

In another embodiment of this application, the method provided in this embodiment of this application further includes the following steps.

Step 107: The data analytics function network element obtains first data that corresponds to any slice and that is on at least two network elements, and the first data that corresponds to the any slice and that is on the at least two network elements includes a first identity.

For example, the data analytics function network element obtains service data that is of at least one QoS flow corresponding to each slice and that is on the application network element and network data that is of the at least one QoS flow corresponding to the slice and that is on the network element. The service data includes the first identity and geographical area information. The network data includes the first identity and network area information.

Step 108: The data analytics function network element obtains, based on the first identity and the first data that corresponds to the any slice and that is on the at least two network elements, second data corresponding to the any slice, where the second data includes at least the first data that corresponds to the any slice and that is on each network element.

For example, the data analytics function network element processes the service data of the at least one QoS flow and the network data of the at least one QoS flow of each slice based on the first identity, to obtain second information of each slice, where the second information includes at least network area information.

The geographical area information includes one or more of the following information: identity information, at least one cell identity, at least one tracking area identity, at least one routing area identity, and at least one piece of global positioning system GPS information.

It should be understood that the identity information, for example, global position system (GPS) list information, of a geographical area is used to identify a physical area in which a service in the slice is located.

The network area information includes one or more of the following information of a network area: identity information, at least one cell identity, at least one tracking area identity, at least one routing area identity, and at least one piece of GPS information.

It should be understood that the identity information, for example, cell list information or tracking area (TA) list information, of the network area is used to identify the network area in which the service in the slice is located.

The time information includes one or more of the following information: a time stamp, a time window, a time interval, and a time period.

When the management and control function network element is the slice management and control network element, in another embodiment of this application, the method provided in this embodiment of this application further includes the following steps.

Step 109: The slice management and control network element sends, to at least one policy management and control network element corresponding to any one of the at least one slice, the identity information of the any one slice, and one or more of the following information corresponding to the any one slice: network area information, time information, or the at least one piece of service control information.

When the management and control function network element is the slice management and control network element, in another embodiment of this application, the method provided in this embodiment of this application further includes the following steps.

Step 110: The slice management and control network element obtains a second request of a terminal, where the second request is used to request network slice instance (NSI) information of a first slice serving the terminal, and the second request includes identity information of the first slice and network area information of the terminal.

Specifically, when the terminal can use an application of the first slice, the terminal sends a registration request message to the AMF network element in a process in which the terminal registers with a core network, where the registration request message carries single network slice selection support information (S-NSSAI) requested by the terminal. In the process in which the terminal registers with the core network, the AMF network element sends the second request to the slice management and control network element, where the second request is used to request allowed S-NSSAI corresponding to the single network slice selection support information and a corresponding first network slice instance, and the second request further carries the network area information of the terminal.

For example, the network area information of the terminal may be identity information of a cell in which the terminal is located. For example, the second request may be a request service operation Nnssf NS Selection Get.

Step 111: The slice management and control network element sends a second response to the terminal, where the second response includes the network slice instance information of the first slice.

Specifically, step 111 may be specifically implemented in the following manner: After obtaining the network area information of the terminal, the slice management and control network element obtains, based on a first network area indicated by the network area information of the terminal, application control information in the first network area and the first network slice instance accessed by the terminal, from a plurality of network areas corresponding to the first slice; and then sends the service control information and the first network slice instance to the terminal by using the AMF network element.

When the management and control function network element is the policy management and control network element, the method provided in this embodiment of this application further includes the following steps.

Step 112: The application network element sends a third request to the policy management and control network element. The third request includes identity information of a second slice, and one or more of the following information corresponding to the second slice: time information, geographical area information, and service requirement information of at least one service.

Specifically, after an OAM system deploys the second slice, the application network element may put forward the third request (namely, a QoE requirement of the second slice). For specific requirement content, refer to the description in the foregoing embodiment. Details are not described herein again.

Step 113: The policy management and control network element receives the third request from the application network element, where the policy management and control network element serves the second slice of the at least one slice.

Step 114: The policy management and control network element sends a third response to the application network element, where the third response includes the identity information of the second slice and one or more of the following information corresponding to the second slice: the geographical area information and service response information of the at least one service.

Specifically, for a manner of obtaining the third response by the policy management and control network element in step 114, refer to the foregoing process of obtaining the first response by the management and control function network element. Details are not described herein again.

In another embodiment of this application, the method provided in this application further includes: receiving, by the policy management and control network element, a fourth request from the application network element, where the fourth request is used to request to establish a service of the terminal in the second slice, and the fourth request includes one or more of the following information: the identity information of the second slice, a service identity of the service, a service experience range requirement of the service, a service experience requirement of the service, time information, identity information of the terminal, and geographical area information of the terminal It should be understood that, after receiving the fourth request, the policy management and control network element may perform a QoS flow establishment process corresponding to the service.

In the method provided in this embodiment of this application, the method further includes: when the management and control function network element is the policy management and control network element, sending, by the management and control function network element to the SMF network element, a priority corresponding to a first slice.

It should be understood that the priority of the first slice may be determined by the NSSF network element.

Specifically, the priority corresponding to the first slice may be carried in a PCC rule and sent to the SMF network element. After receiving the priority corresponding to the first slice, the SMF network element sends the priority of the first slice to the RAN by using N2 SM information in a process of establishing a service in the first slice, and sends the priority of the first slice to the terminal through an N1 SM container.

In addition, if a third slice is further deployed after the first slice is deployed, in an initial phase of deploying the third slice, the NSSF network element sets the priority of the first slice to be higher than a priority of the second slice, and then the NSSF network element sends the priority of the first slice to a policy control network element corresponding to the first slice, and the priority of the second slice to a policy control network element corresponding to the second slice. Then, the policy control network element corresponding to the first slice sends the priority of the first slice to an access network device/the terminal, and the policy control network element corresponding to the second slice sends the priority of the second slice to the access network device/the terminal.

Specifically, in the process of establishing the service in the first slice or the second slice, the policy control network element sends a priority of a corresponding slice to the RAN by using the N2 SM information, and the RAN may ensure, based on the priority of the first slice and the priority of the second slice, that the service of the first slice is not affected on an air interface. For example, the RAN preferentially processes a user control behavior or a service control behavior in a first service. After obtaining the priority of the first slice and the priority of the second slice, the terminal may preferentially send Request S-NSSAI of the first slice to a network side when re-initiating a registration procedure.

The foregoing mainly describes the solutions in the embodiments of this application from a perspective of interaction between the network elements. It can be understood that each network element, such as the slice information processing apparatus, includes hardware structures and/or software modules for executing corresponding functions, to implement the foregoing functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the slice information processing apparatus may be divided into function units based on the foregoing method example. For example, each function unit may be obtained through division based on a corresponding function, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

An example in which each function module is obtained through division based on each corresponding function is used below for description.

Figure 9:
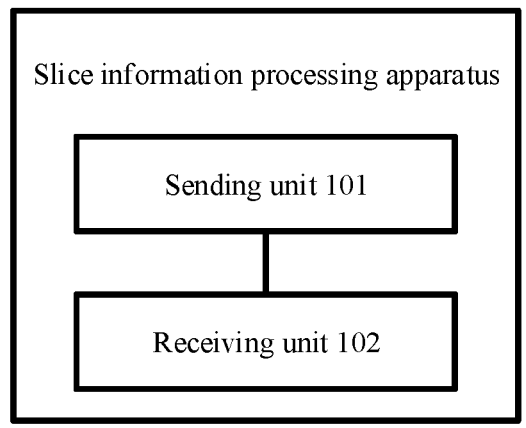
FIG. 9 to FIG. 14 each are schematic structural diagrams of a slice information processing apparatus according to an embodiment of this application.

When an integrated unit is used, FIG. 9 is a schematic diagram of a possible structure of the slice information processing apparatus in the foregoing embodiments. The slice information processing apparatus may be a management and control function network element, or may be a chip used in a management and control function network element. The slice information processing apparatus includes a sending unit 101 and a receiving unit 102.

The management and control function network element may be a slice management and control network element, or may be a policy management and control network element. Therefore, the following separately provides description.

In an example, when the management and control function network element is the slice management and control network element or a chip in the slice management and control network element, the sending unit 101 is configured to support the slice information processing apparatus in performing step 101, step 109, and step 111 in the foregoing embodiment. The receiving unit 102 is configured to support the slice information processing apparatus in performing step 104, step 106, and step 110 in the foregoing embodiment.

In another example, when the management and control function network element is the policy management and control network element or a chip in the policy management and control network element, the sending unit 101 is configured to support the slice information processing apparatus in performing step 101 in the foregoing embodiment. The receiving unit 102 is configured to support the slice information processing apparatus in performing step 104, step 106, step 113, and step 114 in the foregoing embodiment.

Figure 10:
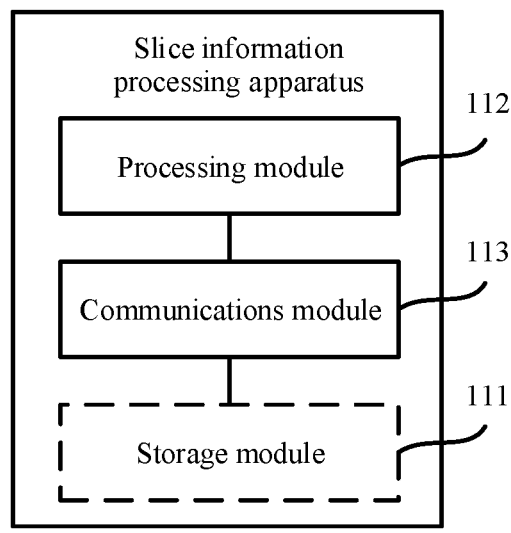

When an integrated unit is used, FIG. 10 is a schematic diagram of a possible logical structure of the slice information processing apparatus in the foregoing embodiments. The slice information processing apparatus may be a management and control function network element, or may be a chip used in a management and control function network element. The slice information processing apparatus includes a processing module 112 and a communications module 113. The processing module 112 is configured to control and manage an action of the slice information processing apparatus. For example, the processing module 112 is configured to support the slice information processing apparatus in performing an information/data processing step. The communications module 113 is configured to support the slice information processing apparatus in performing an information/data sending or receiving step. Optionally, the slice information processing apparatus may further include a storage module 111, configured to store program code and data that are of the slice information processing apparatus.

The management and control function network element may be a slice management and control network element, or may be a policy management and control network element. Therefore, the following separately provides description.

In an example, when the management and control function network element is the slice management and control network element or a chip in the slice management and control network element, the communications module 113 is configured to support the slice information processing apparatus in performing step 101, step 109, and step 111 in the foregoing embodiment. The communications module 113 is configured to support the slice information processing apparatus in performing step 104, step 106, and step 110 in the foregoing embodiment.

In another example, when the management and control function network element is the policy management and control network element or a chip in the policy management and control network element, the communications module 113 is configured to support the slice information processing apparatus in performing step 101 in the foregoing embodiment. The communications module 113 is configured to support the slice information processing apparatus in performing step 104, step 106, step 113, and step 114 in the foregoing embodiment.

The processing module 112 may be a processor or a controller, for example, may be a central processing unit, a general purpose processor, a digital signal processor, an application-specific integrated circuit, a field-programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 11:
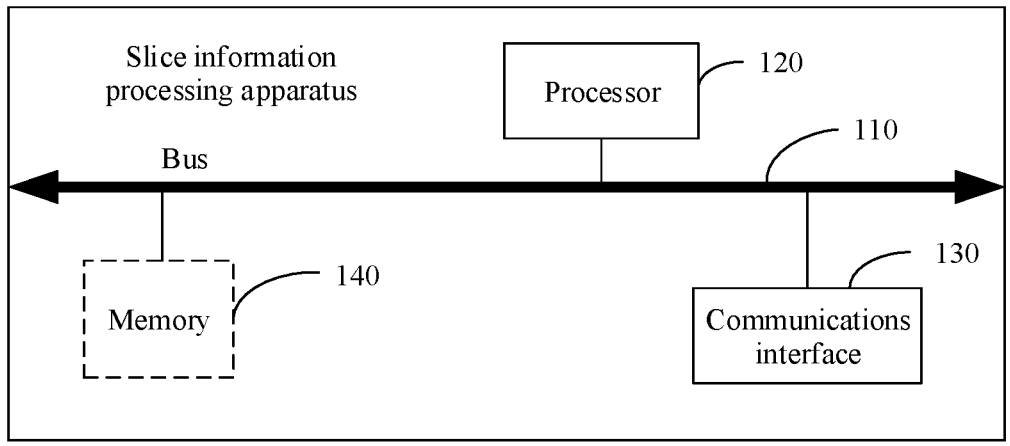

When the processing module 112 is a processor 120, the communications module 113 is a communications interface 130 or a transceiver, and the storage module 111 is a memory 140, the slice information processing apparatus in this application may be a device shown in FIG. 11.

The communications interface 130, at least one processor 120, and the memory 140 are connected to each other through a bus 110. The bus 110 may be a PCI bus, an EISA bus, or the like. The bus may be classified into an address bus, a data bus, a control bus, and the like. For ease of representation, only one thick line is used to represent the bus in FIG. 11, but this does not mean that there is only one bus or only one type of bus. The memory 140 is configured to store program code and data that are of the slice information processing apparatus. The communications interface 130 is configured to support the slice information processing apparatus in communicating with another device (for example, a data analytics function network element). The processor 120 is configured to support the slice information processing apparatus in executing the program code and the data that are stored in the memory 140, to implement the slice information processing method provided in this application.

Figure 12:
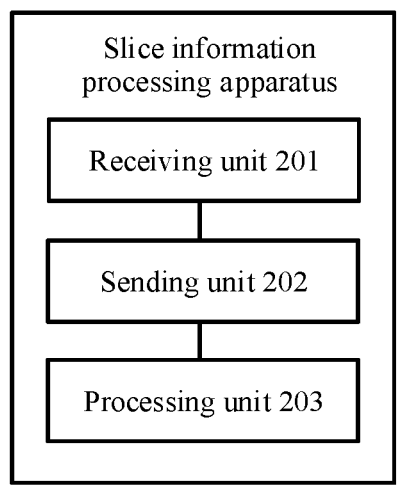

When an integrated unit is used, FIG. 12 is a schematic diagram of a possible structure of the slice information processing apparatus in the foregoing embodiments. The slice information processing apparatus may be a data analytics function network element, or may be a chip used in a data analytics function network element. The slice information processing apparatus includes a receiving unit 201 and a sending unit 202. Optionally, the slice information processing apparatus may further include a processing unit 203.

The receiving unit 201 is configured to support the slice information processing apparatus in performing step 102 in the foregoing embodiment. The sending unit 202 is configured to support the slice information processing apparatus in performing step 103 and step 105 in the foregoing embodiment. The processing unit 203 is configured to support the slice information processing apparatus in performing step 107 and step 108 in the foregoing embodiment.

Figure 13:
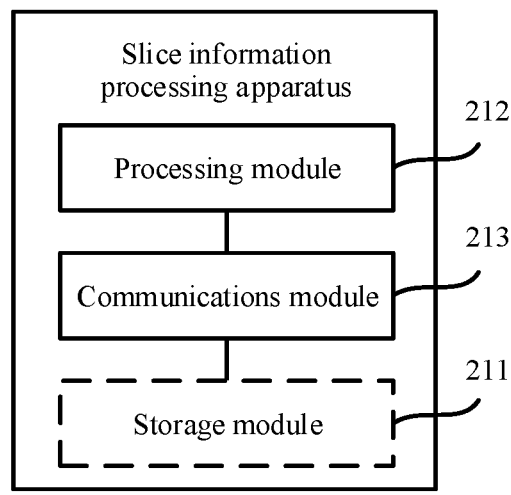

When an integrated unit is used, FIG. 13 is a schematic diagram of a possible logical structure of the slice information processing apparatus in the foregoing embodiments. The slice information processing apparatus may be a data analytics function network element, or may be a chip used in a data analytics function network element. The slice information processing apparatus includes a processing module 212 and a communications module 213. The processing module 212 is configured to control and manage an action of the slice information processing apparatus. For example, the processing module 212 is configured to support the slice information processing apparatus in performing an information/data processing step. The communications module 213 is configured to support the slice information processing apparatus in performing an information/data sending or receiving step. Optionally, the slice information processing apparatus may further include a storage module 211, configured to store program code and data that are of the slice information processing apparatus.

The communications module 213 is configured to support the slice information processing apparatus in performing step 102, step 103, and step 105 in the foregoing embodiment. The processing module 212 is configured to support the slice information processing apparatus in performing step 107 and step 108 in the foregoing embodiment.

The processing module 212 may be a processor or a controller, for example, may be a central processing unit, a general purpose processor, a digital signal processor, an application-specific integrated circuit, a field-programmable gate array or another programmable logic device, a transistor logic device, a hardware component, or any combination thereof. The processing module 212 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 14:
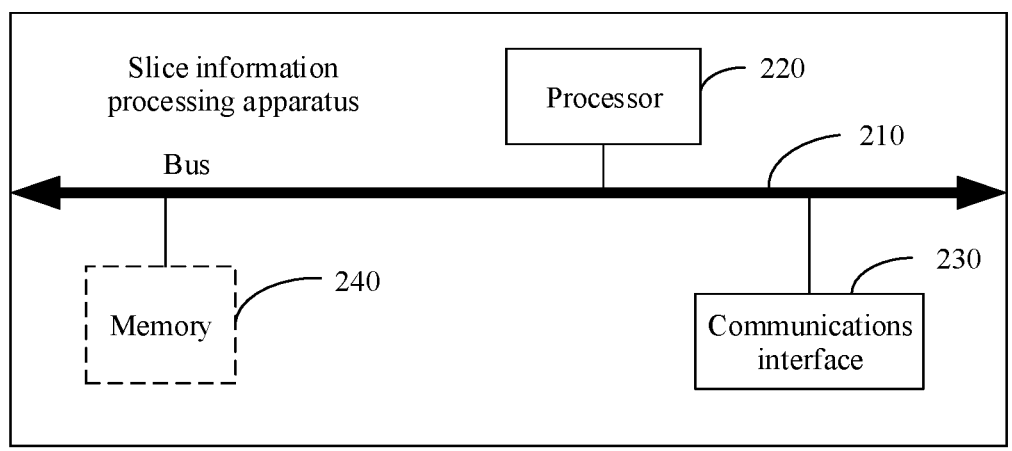

When the processing module 212 is a processor 220, the communications module 213 is a communications interface 230 or a transceiver, and the storage module 211 is a memory 240, the slice information processing apparatus in this application may be a device shown in FIG. 14.

Figure 15:
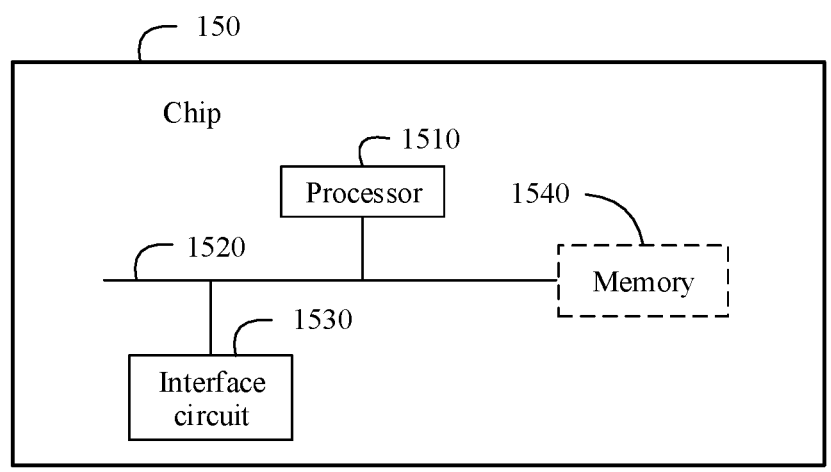
FIG. 15 is a schematic structural diagram of a chip according to an embodiment of this application.

FIG. 15 is a schematic structural diagram of a chip 150 according to an embodiment of the present invention. The chip 150 includes one or more (including two) processors 1510 and an interface circuit 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements, an executable module or a data structure, or a subset thereof, or an extension set thereof:

In this embodiment of the present invention, a corresponding operation is performed by invoking the operation instruction stored in the memory 1540 (where the operation instruction may be stored in an operating system).

In a possible implementation, a structure of a chip used in the management and control function network element is similar to a structure of a chip used in the data analytics function network element, and different chips may be used in different apparatuses to implement respective functions.

The processor 1510 controls a communications apparatus and an operation of the communications apparatus. The processor 1510 may also be referred to as a central processing unit (CPU). The memory 1540 may include a read-only memory and a random access memory, and provide an instruction and data for the processor 1510. A part of the memory 1540 may further include a non-volatile random access memory (NVRAM). For example, during application, the processor 1510, the interface circuit 1530, and the memory 1540 are coupled together through a bus system

1520. The bus system 1520 may further include a power bus, a control bus, a status signal bus, and the like in addition to a data bus. However, for clear description, various types of buses in FIG. 15 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, the steps in the foregoing method may be implemented by using a hardware integrated logical circuit in the processor 1510, or by using an instruction in a form of software. The processor 1510 may be a general purpose processor, a digital signal processor (DSP), an application specific integrated circuit (ASIC), a field-programmable gate array (FPGA) or another programmable logic device, a discrete gate or transistor logic device, or a discrete hardware component. The processor 1510 may implement or perform the methods, steps, and logical block diagrams that are disclosed in the embodiments of the present invention. The general purpose processor may be a microprocessor, or the processor may be any conventional processor or the like. The steps of the methods disclosed with reference to the embodiments of the present invention may be directly performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the interface circuit 1530 is configured to perform the sending and receiving steps of the management and control function network element and the data analytics function network element in the embodiments shown in FIG. 3 and FIG. 8. The processor 1510 is configured to perform the processing steps of the management and control function network element and the data analytics function network element in the embodiments shown in FIG. 3 and FIG. 8.

In the foregoing embodiment, the instruction that is stored in the memory and that is to be executed by the processor may be implemented in a form of a computer program product. The computer program product may be written to the memory in advance, or may be downloaded in a form of software and installed in the memory.

The computer program product includes one or more computer instructions. When the computer program instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive SSD), or the like.

According to one aspect, a computer-readable storage medium is provided. The computer-readable storage medium stores an instruction, and when the instruction is run, a slice management and control network element or a chip used in a slice management and control network element is enabled to perform step 101, step 109, step 111, step 104, step 106, and step 110 in the embodiments.

According to another aspect, a computer-readable storage medium is provided. The computer-readable storage medium stores an instruction, and when the instruction is run, a policy management and control network element or a chip used in a policy management and control network element is enabled to perform step 101, step 104, step 106, step 113, and step 114 in the embodiments.

According to still another aspect, a computer-readable storage medium is provided. The computer-readable storage medium stores an instruction, and when the instruction is run, a data analytics function network element or a chip used in a data analytics function network element is enabled to perform step 102, step 103, step 105, step 107, and step 108 in the embodiments.

The foregoing readable storage medium may include any medium that can store program code, such as a USB flash drive, a removable hard disk, a read-only memory, a random access memory, a magnetic disk, or an optical disc.

According to one aspect, a computer program product including an instruction is provided. The computer program product stores an instruction, and when the instruction is run, a slice management and control network element or a chip used in a slice management and control network element is enabled to perform step 101, step 109, step 111, step 104, step 106, and step 110 in the embodiments.

According to another aspect, a computer program product including an instruction is provided. The computer program product stores an instruction, and when the instruction is run, a policy management and control network element or a chip used in a policy management and control network element is enabled to perform step 101, step 104, step 106, step 113, and step 114 in the embodiments.

According to another aspect, a computer program product including an instruction is provided. The computer program product stores an instruction, and when the instruction is run, a data analytics function network element or a chip used in a data analytics function network element is enabled to perform step 102, step 103, step 105, step 107, and step 108 in the embodiments.

An embodiment of this application provides a communications system. The system includes the slice information processing apparatus described in any one of FIG. 9 to FIG. 11 and the slice information processing apparatus described in any one of FIG. 12 to FIG. 14. It should be understood that, for the slice information processing apparatus in the system, refer to the description in the foregoing embodiments, and details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, this specification and the accompanying drawings are merely example description of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
    sending, by a management and control function network element, a first request to a data analytics function network element, wherein the first request requests first information of a slice network comprising at least one slice, wherein the first request comprises identity information of the at least one slice, and wherein the management and control function network element is a policy control function (PCF) network element;
    receiving, by the management and control function network element, a first response from the data analytics function network element, wherein the first response comprises the first information, wherein the first information is used for service control of each slice of the at least one slice, wherein the first information comprises at least one piece of service control information corresponding to each of the at least one slice, wherein each of the at least one piece of service control information comprises at least one of network area information and at least one piece of network slice instance information, wherein the network area information comprises at least one of cell identity, wherein each of the at least one piece of network slice instance information comprises identity information of a network slice instance and at least one piece of service configuration information, wherein each of the at least one piece of the service configuration information comprises a service identity, a maximum quantity of services that can be accommodated in a cell, and at least one piece of service experience range information, wherein each of the at least one piece of service experience range information comprises: a size of a service experience range, a maximum quantity of services that is within the service experience range and that can be accommodated in the cell, and at least one set of quality of service, QoS, parameters of the service experience range; and
    implementing, by the management and control function network element, service control of the at least one slice based on the first information.

2. The method according to claim 1, wherein the method further comprises:
    sending, by the data analytics function network element, the first response to the management and control function network element.

3. An apparatus, comprising:
    at least one processor; and
    one or more memories coupled to the at least one processor and storing programming instructions for execution by the at least one processor to cause the apparatus to:
        send, by a management and control function network element, a first request to a data analytics function network element, wherein the first request requests first information of a slice network comprising at least one slice, wherein the first request comprises identity information of the at least one slice, and wherein the management and control function network element is a policy control function (PCF) network element;
        receive, by the management and control function network element, a first response from the data analytics function network element, wherein the first response comprises the first information, wherein the first information is used for service control of each slice of the at least one slice, wherein the first information comprises at least one piece of service control information corresponding to each of the at least one slice, wherein each of the at least one piece of service control information comprises at least one of network area information and at least one piece of network slice instance information, wherein the network area information comprises at least one of cell identity, wherein each of the at least one piece of network slice instance information comprises identity information of a network slice instance and at least one piece of service configuration information, wherein each of the at least one piece of the service configuration information comprises a service identity, a maximum quantity of services that can be accommodated in a cell, and at least one piece of service experience range information, wherein each of the at least one piece of service experience range information comprises: a size of a service experience range, a maximum quantity of services that is within the service experience range and that can be accommodated in the cell, and at least one set of quality of service, QoS, parameters of the service experience range; and implement, by the management and control function network element, service control of the at least one slice based on the first information.

4. The apparatus according to claim 3, wherein the programming instructions are for execution by the at least one processor to cause the apparatus to:

send the first response to the management and control function network element.

5. A communications system, comprising a management and control function network element and a data analytics function network element, wherein:

the management and control function network element comprises:

at least one processor; and one or more memories coupled to the at least one processor and storing programming instructions for execution by the at least one processor to cause the management and control function network element to:

send a first request to a data analytics function network element, wherein the first request requests first information of a slice network comprising at least one slice, wherein the first request comprises identity information of the at least one slice, and wherein the management and control function network element is a policy control function (PCF) network element;

receive a first response from the data analytics function network element, wherein the first response comprises the first information, wherein the first information is used for service control of each slice of the at least one slice, wherein the first information comprises at least one piece of service control information corresponding to each of the at least one slice, wherein each of the at least one piece of service control information comprises at least one of network area information and at least one piece of network slice instance information, wherein the network area information comprises at least one of cell identity, wherein each of the at least one piece of network slice instance information comprises identity information of a network slice instance and at least one piece of service configuration information, wherein each of the at least one piece of the service configuration information comprises a service identity, a maximum quantity of services that can be accommodated in a cell, and at least one piece of service experience range information, wherein each of the at least one piece of service experience range information comprises: a size of a service experience range, a maximum quantity of services that is within the service experience range and that can be accommodated in the cell, and at least one set of quality of service, QoS, parameters of the service experience range; and implement, by the management and control function network element, service control of the at least one slice based on the first information.

* * * * *